United States Patent [19]
Kikuchi et al.

[11] Patent Number: 5,745,200
[45] Date of Patent: Apr. 28, 1998

[54] COLOR LIQUID CRYSTAL DISPLAY DEVICE AND LIQUID CRYSTAL DISPLAY APPARATUS

[75] Inventors: Zenta Kikuchi, Hamura; Tetsushi Yoshida, Kanagawa; Hisashi Aoki, Hamura, all of Japan

[73] Assignee: Casio Computer Co., Ltd., Tokyo, Japan

[21] Appl. No.: 427,139

[22] Filed: Apr. 24, 1995

[30] Foreign Application Priority Data

Apr. 28, 1994 [JP] Japan ................... 6-111673
Apr. 28, 1994 [JP] Japan ................... 6-111687

[51] Int. Cl.$^6$ .............. G02F 1/1335; G02F 1/1337; C09K 19/02
[52] U.S. Cl. .............. 349/99; 349/181; 349/130
[58] Field of Search .................. 359/63, 75, 77, 359/73; 349/99, 118, 103, 130, 181

[56] References Cited

U.S. PATENT DOCUMENTS

| | | | |
|---|---|---|---|
| 3,915,554 | 10/1975 | Maezawa | 359/63 |
| 4,632,514 | 12/1986 | Ogawa et al. | 359/75 |
| 5,091,794 | 2/1992 | Suzuki | 359/77 |
| 5,095,378 | 3/1992 | Suzuki | 359/62 |
| 5,194,975 | 3/1993 | Akatsuka et al. | 359/73 |
| 5,196,953 | 3/1993 | Yeh et al. | 359/73 |
| 5,216,414 | 6/1993 | Fukutani et al. | 340/784 |
| 5,235,450 | 8/1993 | Yoshimura | 349/118 |
| 5,241,408 | 8/1993 | Ishikawa et al. | 359/73 |
| 5,473,455 | 12/1995 | Koike et al. | 359/76 |
| 5,475,396 | 12/1995 | Kitajima et al. | 345/92 |
| 5,504,604 | 4/1996 | Takatori et al. | 359/75 |
| 5,559,617 | 9/1996 | Mitsui et al. | 359/73 |
| 5,680,184 | 10/1997 | Nishino | 349/118 |

FOREIGN PATENT DOCUMENTS 2-201422  8/1990  Japan .

*Primary Examiner*—William L. Sikes
*Assistant Examiner*—Tiep H. Nguyen
*Attorney, Agent, or Firm*—Frishauf, Holtz, Goodman, Langer & Chick

[57] ABSTRACT

A birefringence control type color liquid crystal display device includes a liquid crystal cell having first and second substrates; first and second electrodes formed on opposing surfaces of the first and second substrates; a first aligning film formed on the first electrode and subjected to an aligning treatment in a first direction; a second aligning film formed on the second electrode and the second substrate and subjected to an aligning treatment in a second direction intersecting the first direction at 90 degrees; and a liquid crystal sealed between the first and second aligning films and twisted at 90 degrees. The device further includes a first polarization plate arranged outside of the second substrate and having a transmission axis intersecting the first direction at substantially 140 to 160 degrees; a second polarization plate arranged outside of the first substrate and having a transmission axis intersecting the transmission axis of the first polarization plate at substantially 10 to 40 degrees; a first retardation plate arranged between the second substrate and the second polarization plate, with a direction of a maximum refraction index intersecting the first direction at 130 to 160 degrees; and a second retardation plate arranged between the second substrate and the second polarization plate, with a direction of a maximum refraction index intersecting the first direction at substantially 40 to 80 degrees.

29 Claims, 39 Drawing Sheets

| IMAGE DATA<br>R G B | DIGITAL<br>VOLTAGE DATA |
|---|---|
| 0 0 0 | 1 1 1 |
| 0 0 1 | 0 1 0 |
| 0 1 0 | 0 0 0 |
| 0 1 1 | 0 0 1 |
| ⋮ | ⋮ |
| 1 0 0 | 0 1 1 |
| ⋮ | ⋮ |
| 1 1 1 | 1 1 0 |

FIG.43

| IMAGE DATA R G B | DIGITAL VOLTAGE DATA |
|---|---|
| 0 0 0 | 1 0 1 |
| 0 0 1 | 1 0 0 |
| 0 1 0 | 0 1 1 |
| 0 1 1 | 0 0 1 |
| ⋮ | ⋮ |
| 1 0 0 | 0 0 0 |
| ⋮ | ⋮ |
| 1 1 1 | 1 1 1 |

FIG.46

COLOR LIQUID CRYSTAL DISPLAY DEVICE AND LIQUID CRYSTAL DISPLAY APPARATUS

BACKGROUND OF THE INVENTION

1. Field of the Invention

The present invention relates to a color liquid crystal display device for controlling the birefringence of a liquid crystal to display a color image, and to a liquid crystal display apparatus which uses this device.

2. Description of the Related Art

A super twisted nematic (STN) type liquid crystal display (LCD) device (LCD panel) which displays a multi-colored image is disclosed in Japanese Unexamined Patent Publication No. Hei 2-201422. The LCD device disclosed in this publication ensures a full color display by setting the twist angle of the nematic liquid crystal to a range from 180 degrees to 360 degrees and setting the product of the refractive anisotropy and the thickness of the liquid crystal layer, $\Delta n.d$, to 1.1 μm or greater.

The twist angle of the liquid crystal molecules in the disclosed STN type LCD device ranging between 180 degrees and 360 degrees is however very large. This LCD device suffers a slow response speed and an insufficient frame frequency for displaying dynamic images, for example. Since the twist angle of the liquid crystal is large, the aligned state of the liquid crystal molecules is apt to become unstable. Therefore, the performance of the aligning film to stably twist the liquid crystal molecules is important; for example, when it is necessary to set the pretilt angle to 5 degrees or greater, the production of the aligning film becomes difficult. This restricts the material for the aligning film. Further, the liquid crystal having a large elastic constant ratio K33/K11 is difficult to be aligned, which leaves an alternative of selecting a liquid crystal having a small elastic constant ratio. This restricts the selectable liquid crystals.

Because $\Delta n.d$ of the liquid crystal layer is large, the liquid crystal layer should be made thicker or a liquid crystal having a large $\Delta n$ should be used, thus narrowing the field of view. Increasing the liquid crystal layer weakens the applied electric field, which lowers the response speed.

Since $\Delta n.d$ of the liquid crystal layer is large, a significant change occurs in retardation with respect to a change in applied voltage or a change in the thickness of the liquid crystal layer. Accordingly, irregularity occurs in the display color due to a variation in the thickness of the liquid crystal layer and a variation in the voltages to be applied to the individual portions of the liquid crystal layer. It is difficult to keep the thickness of the liquid crystal layer constant and to eliminate a delicate fluctuation in supply voltage, so that the desired colors cannot be displayed stably. Since the same color is displayed in a wide area in the background portion of an image, particularly, the irregular display becomes prominent and irksome.

Further, the conventional birefringence control type of LCD device cannot independently control the hue and luminance. Thus, while the birefringence control type of color LCD device can provide multi-colored display, it nevertheless suffers from a difficulty in the gradation display which controls the brightness of the colors. This disables a full-color display.

Furthermore, the conventional birefringence control type of LCD device cannot display red, green, blue, white and black with high purities, making it difficult to display a beautiful full-color image.

One LCD device which displays a color image uses a color filter. The procedures for manufacturing this LCD device are complicated and the in the device, light is attenuated by the filter, so that the display undesirably becomes dark.

Another shortcoming of the conventional birefringence control type of color LCD apparatus is its large power consumption, so that if such an LCD apparatus is adapted for a portable LCD apparatus which operates on battery power, it suffers from a short battery-operable time.

SUMMARY OF THE INVENTION

Accordingly, it is a primary object of the present invention to provide an improved birefringence control type of color liquid crystal display device.

It is another object of this invention to provide a birefringence control type of color liquid crystal display apparatus which has a quick response speed, which can display a full-color image and which is easy to manufacture.

It is a further object of this invention to provide a birefringence control type of color liquid crystal display apparatus which is not likely to present an irregular display.

It is a still further object of this invention to provide a birefringence control type of color liquid crystal display apparatus which consumes less power.

To achieve the above objects, a color liquid crystal display device according to a first aspect of this invention comprises:

a pair of substrates arranged to face each other, at least one electrode being formed on an inner surface of each substrate, those electrodes on the substrates facing each other;

aligning films formed in surfaces of the pair of substrates on which the electrodes are formed;

a liquid crystal sealed between the aligning films so as to form a liquid crystal layer, a birefringence of the liquid crystal layer being variable in accordance with a voltage applied between the opposing electrodes; and at least one polarization plate arranged outside of at least one of the substrates, the liquid crystal layer having a predetermined birefringence and an optical axis of the polarization plate being set to a predetermined direction so as to provide a first voltage range where the color liquid crystal display apparatus operates in a first mode in which a hue of a display color changes in accordance with a change in the voltage applied between the electrodes and a second voltage range where the color liquid crystal display device operates in a second mode in which a brightness of a display color changes in a substantially colorless manner in accordance with a change in the voltage applied between the electrodes.

This structure allows the voltage applied to the color liquid crystal display device to be separated to a voltage range for controlling the full-color display and a voltage range for controlling the gradation in a colorless manner. The display control is therefore very easy.

A color liquid crystal display device according to a second aspect of this invention comprises:

first and second substrates arranged to face each other;

first and second electrodes formed on opposing surfaces of the first and second substrates;

a first aligning film formed on the first electrode and the first substrate and subjected to an aligning treatment in a first direction;

a second aligning film formed on the second electrode and the second substrate and subjected to an aligning treatment in a second direction intersecting the first direction at a predetermined angle;

a liquid crystal located between the first and second aligning films, a product of a refractive anisotropy $\Delta n$ and a thickness of the liquid crystal layer being equal to or greater than 0.7 µm and less than 1.1 µm; and at least one polarization plate arranged outside of at least one of the first and second substrates.

With this structure, the product of the refractive anisotropy $\Delta n$ and the thickness d of the liquid crystal layer is set equal to or greater than 0.7 µm and less than 1.1 µm, which is not too small or too large. It is therefore possible to display a full-color image and prevent a significant change in display color from occurring due to a variation in voltage and a variation in the thickness of the liquid crystal layer.

A color liquid crystal display device according to a third aspect of this invention comprises:

first and second substrates arranged to face each other;

first and second electrodes formed on opposing surfaces of the first and second substrates;

a first aligning film formed on the first electrode and the first substrate and subjected to an aligning treatment in a first direction;

a second aligning film formed on the second electrode and the second substrate and subjected to an aligning treatment in a second direction intersecting the first direction at substantially 90 degrees;

a liquid crystal layer sealed between the first and second aligning films and twisted by substantially 90 degrees, a product of a refractive anisotropy $\Delta n$ and a thickness of the liquid crystal layer being equal to or greater than 0.7 µm and less than 1.1 µm;

a first polarization plate arranged outside of the first substrate and having a transmission axis intersecting the first direction at substantially 140 to 160 degrees;

a second polarization plate arranged outside of the second substrate and having a transmission axis intersecting the transmission axis of the first polarization plate at substantially 10 to 40 degrees or 110 to 130 degrees; and a retardation plate arranged between the first and second polarization plates.

With this structure, the product of the refractive anisotropy $\Delta n$ and the thickness d of the liquid crystal layer is set equal to or greater than 0.7 µm and less than 1.1 µm, which is not too small or too large. It is therefore possible to display a full-color image and prevent a significant change in display color from occurring due to a variation in voltage and a variation in the thickness of the liquid crystal layer.

A color liquid crystal display device according to a fourth aspect of this invention comprises:

a pair of substrates arranged to face each other, at least one electrode being formed on an inner surface of each substrate, those electrodes on the substrates facing each other;

aligning films formed in surfaces of the pair of substrates on which the electrodes are formed;

a liquid crystal sealed between the aligning films so as to form a liquid crystal layer, a birefringence of the liquid crystal layer being variable in accordance with a voltage applied between the opposing electrodes; and at least one polarization plate located outside of at least one of the substrates, the birefringence of the liquid crystal layer being set in such a way that and a direction of an optical axis of the polarization plate being set to a predetermined direction such that a dependency (wavelength-dependency) of intensity of transmission light through the liquid crystal device on a wavelength of the transmission light, with a birefringence defined by an aligned state of liquid crystal molecules according to a highest one of voltages applied between the facing electrodes, is compensated, thereby displaying substantial white with colorless and high brightness in accordance with the highest applied voltage, and colors in accordance with other applied voltages than the highest applied voltage.

White is the color by which irregular display becomes particularly prominent. According to this invention, as white is displayed with a high applied voltage, the irregular display can be suppressed.

A color liquid crystal display device according to the fifth aspect of the present invention comprising:

a pair of substrates arranged to face each other, at least one electrode being formed on an inner surface of each substrate, those electrodes on the substrates facing each other;

aligning films formed in surfaces of the pair of substrates on which the electrodes are formed;

a liquid crystal sealed between the aligning films so as to form a liquid crystal layer, a birefringence of the liquid crystal layer being variable in accordance with a voltage applied between the facing electrodes; and at least one polarization plate located outside of at least one of the substrates, the liquid crystal layer having such a birefringence and a direction of an optical axis of the polarization plate being set in such a way that white is substantially displayed with liquid crystal molecules aligned substantially perpendicular to a substrate surface in accordance with a voltage applied between the electrodes and colors are displayed in other aligned states.

White is the color by which irregular display becomes particularly prominent. According to this invention, as white is displayed with a high applied voltage, the irregular display can be suppressed.

A color liquid crystal display apparatus according to a sixth aspect of this invention comprises:

a color liquid crystal display device comprising a liquid crystal cell having a pair of substrates arranged to face each other, electrodes being formed on inner surfaces of the substrates, aligning films formed in the inner surfaces of the pair of substrates, and a liquid crystal sealed between the aligning films, and at least one polarization plate located on at least surface of the liquid crystal cell, for displaying a first color in accordance with a first voltage applied to the liquid crystal and a second color different from the first color in accordance with a second voltage higher than the first voltage;

image data output means for outputting image data for specifying colors of individual pixels of the liquid crystal display device; and drive means for supplying the first voltage via the electrodes to the liquid crystal in association with image data with a highest frequency of occurrence from among image data output from the image data output means, and applying the second voltage via the electrodes to the liquid crystal in association with image data with a low frequency of occurrence.

With this structure, image data with the highest frequency of occurrence is displayed with the first voltage so that the consumed power can be reduce.

BRIEF DESCRIPTION OF THE DRAWINGS

FIG. 43 is a diagram showing an example of the structure of a conversion table shown in FIG. 41;

FIG. 46 is a diagram exemplifying the structure of a conversion table shown in FIG. 41;

DETAILED DESCRIPTION OF THE PREFERRED EMBODIMENTS

LCD devices according to preferred embodiments of the present invention will now be described with reference to the accompanying drawings.

First Embodiment

To begin with, the structure of the LCD device according to the first embodiment of this invention will be discussed with reference to FIGS. 1 through 4E.

Figure 1:
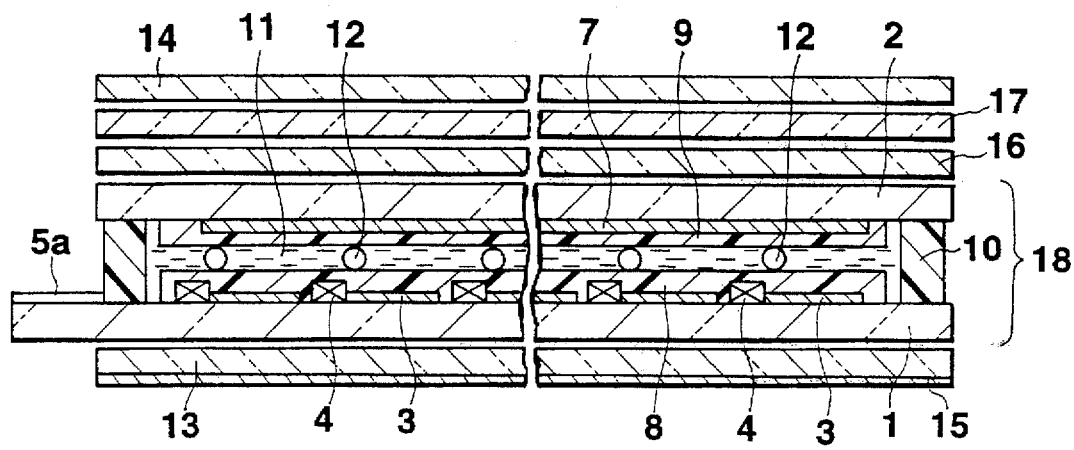
FIG. 1 is a cross-sectional view of a liquid crystal display (LCD) device according to a first embodiment of this invention.
Figure 2:
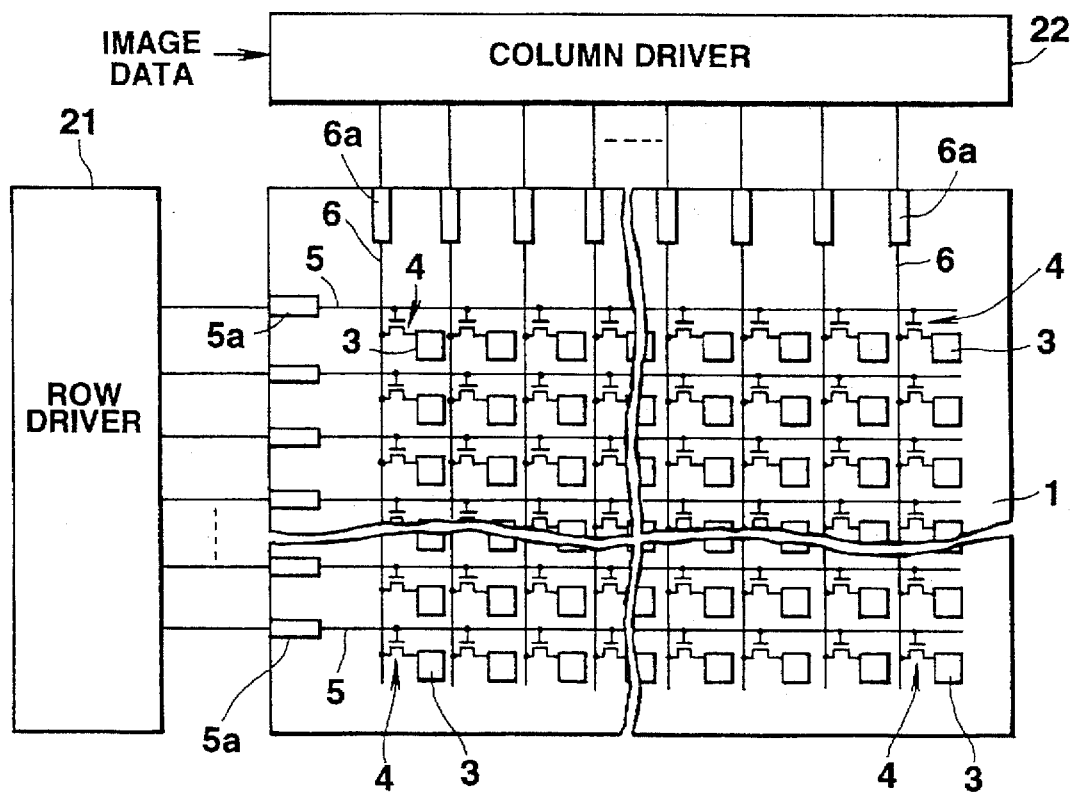
FIG. 2 is a plan view of a substrate on which pixel electrodes and thin film transistors are formed.

FIG. 1 is a cross-sectional view of the LCD display device according to this embodiment, FIG. 2 is a plan view of a substrate on which pixel electrodes and thin film transistors (hereinafter called TFTs) are formed, FIGS. 3A through 3D are plan views for explaining the positional relationship among the directions of aligning treatments, the optical axes of polarization plates, and the drawing axis of a retardation plate, and FIGS. 4A through 4D are perspective views for explaining the positional relationship among the directions of the aligning treatments, the optical axes of the polarization plates, and the drawing axis of the retardation plate.

This LCD device, which is of an active matrix type, has a liquid crystal cell 18, a pair of polarization plates 13 and 14, and two retardation plates 16 and 17.

The liquid crystal cell 18 comprises a pair of transparent substrates (e.g., glass substrates) 1 and 2, connected together via a seal member 10, and a liquid crystal 11 sealed between the transparent substrates 1 and 2. In FIG. 1, transparent pixel electrodes 3 and TFTs 4 connected to the associated pixel electrodes 3 are arranged on the lower substrate (hereinafter referred to as "TFT substrate") 1 in a matrix form.

As shown in FIG. 2, gate lines (scan lines) 5 are laid between the rows of pixel electrodes 3 and data lines (color signal lines) 6 are laid between the columns of pixel electrodes 3. The gate electrodes of the TFTs 4 are connected to the associated gate lines 5, and the drain electrodes are connected to the associated data lines 6.

The gate lines 5 are covered with gate insulating films (transparent films) of the TFTs 4 excluding terminal portions 5a, and the data lines 6 are formed on the gate insulating films. Each pixel electrode 3 is connected at one end portion to the source electrode of the associated TFT 4.

The gate lines 5 are connected to a row driver (gate driver) 21, and the data lines 6 to a column driver (data driver) 22.

In FIG. 1, a transparent opposing electrode 7 opposing the individual pixel electrodes 3 of the TFT substrate 1 is formed on the upper substrate (hereinafter called opposing substrate) 2. A reference voltage is applied to the opposing electrode 7.

A first aligning film (hereinafter referred to as "lower aligning film") 8 is provided on the electrode forming surface of the TFT substrate 1. A second aligning film (upper aligning film) 9 is formed on the electrode forming surface of the opposing substrate 2. The upper and lower aligning films 9 and 8 are formed of an organic polymerization compound, such as polyimide, and their opposing surfaces are subjected to an aligning treatment by rubbing.

The distance between the TFT substrate 1 and the opposing substrate 2 (more precisely, the distance between the aligning films 8 and 9=the thickness d of the liquid crystal layer) is kept at a constant value by gap members 12 studded in the liquid-crystal sealed area.

A first polarization plate (hereinafter referred to as "lower polarization plate") 13 is arranged below the TFT substrate 1, and a first retardation plate (hereinafter referred to as "lower retardation plate") 16 is arranged on the opposing substrate 2. A second retardation plate (hereinafter referred to as "upper retardation plate") 17 is arranged on the lower retardation plate 16, and a second polarization plate (hereinafter referred to as "upper polarization plate") 14 is arranged on the upper retardation plate 17.

The optical axes of the polarization plates 13 and 14 and the retardation plates 16 and 17 are set with the direction of the aligning treatment of the aligning film 8 as a reference.

A reflector 15 is located below the lower polarization plate 13.

The liquid crystal 11 is formed of a nematic liquid crystal which is added with, for example, a chiral liquid crystal for the twist alignment.

If the product $\Delta n \cdot d$ of the refractive anisotropy $\Delta n$ and the thickness d of the liquid crystal layer 11 (hereinafter simply referred to as "liquid crystal layer thickness") is too large, the field of view is narrowed and the response speed becomes slower. Further, the display color undesirably changes drastically due to a minute change in applied voltage. If Δn.d is too small, on the other hand, it is difficult to present the full-color display. According to this embodiment, the refractive anisotropy Δn of the liquid crystal 11 is set to 0.19 to 0.25, the liquid crystal layer thickness d is set to 4 to 5 μm, and their product Δn.d is set equal to or greater than 0.7 μm and less than 1.1 μm, desirably to 0.85 to 1.05 μm, more desirably to 0.95 to 1.03 μm.

The retardation plates 16 and 17, which are produced by drawing, for example, polycarbonate-based resin, comprise 2-axis retardation plates having a retardation even in the thickness direction and has an Nz coefficient value, (nx−nz)/(nx−ny), of about 0.2 to 0.8. The retardation ((nx−ny).d) of the retardation plates 16 and 17 is set to, for example, 370 nm ±30 nm, 400 nm ±30 nm, 570 nm ±30 nm, or the like where nx is the refraction index in the direction where the refraction index becomes maximum on the plane of the retardation plate, ny is the refraction index in the direction perpendicular to the direction of nx on the plane of the retardation plate, nz is the refraction index in the direction perpendicular both to the direction of nx and the direction of ny, and d is the liquid crystal layer thickness.

Figure 3A:
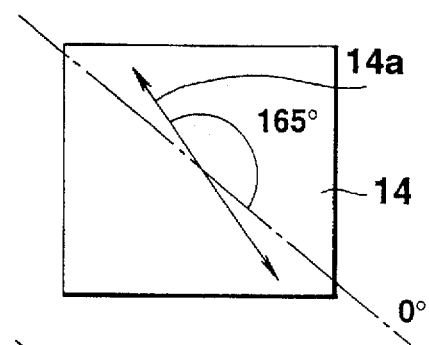
FIGS. 3A–3E are plan views for explaining the directions of the aligning treatments of upper and lower aligning films, the positions of the transmission axes of the upper and lower polarization plates, and the position of the drawing axis of a retardation plate.
Figure 3B:
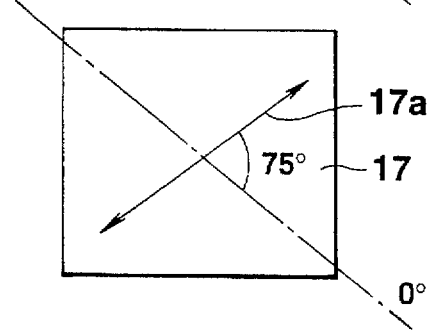
Figure 3C:
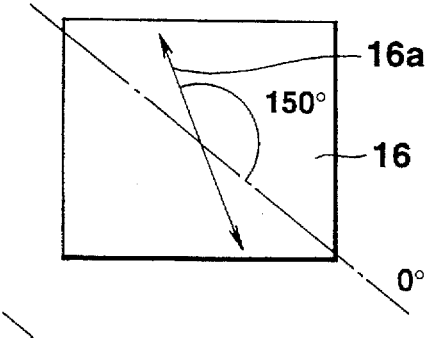
Figure 3D:
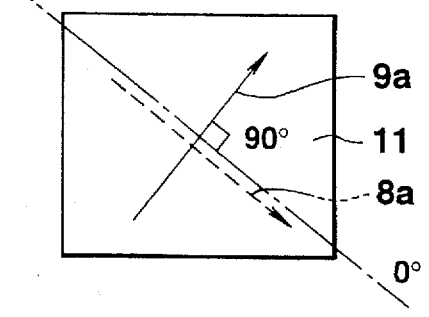
Figure 4A:
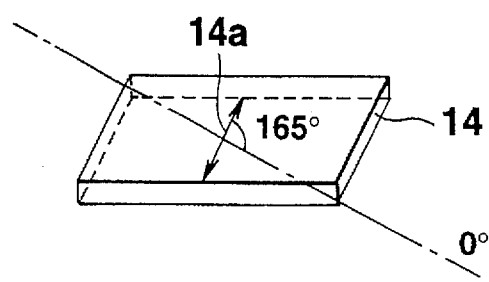
FIGS. 4A–4E are perspective views for explaining the directions of the aligning treatments of the upper and lower aligning films, the positions of the transmission axes of the upper and lower polarization plates, and the position of the drawing axis of the retardation plate.
Figure 4B:
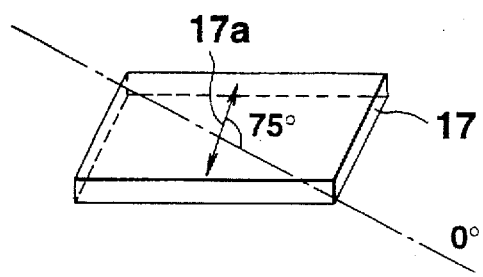
Figure 4C:
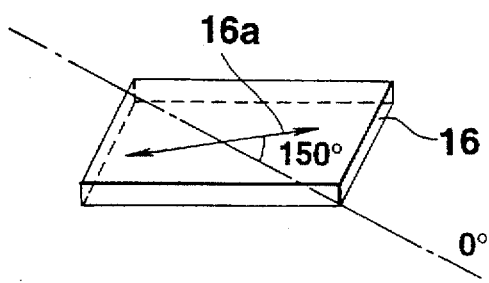
Figure 4D:
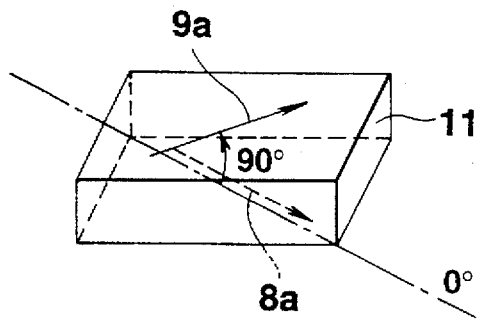

As shown in FIGS. 3D and 4D, the direction, 9a, of the aligning treatment of the upper aligning film 9 intersects the direction, 8a, of the aligning treatment of the lower aligning film 8 at 90 degrees counterclockwise. Accordingly, the liquid crystal molecules are twisted 90 degrees toward the opposing substrate 2 from the TFT substrate 1.

As shown in FIGS. 3A and 4A, the transmission axis, 14a, of the upper polarization plate 14 intersects the aligning treatment direction 8a at 165 degrees.

Figure 3E:
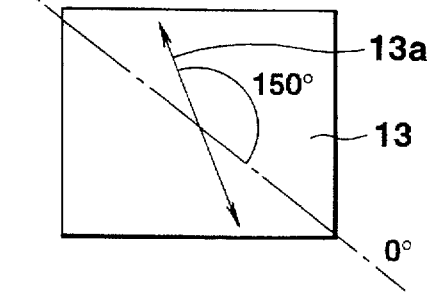
Figure 4E:
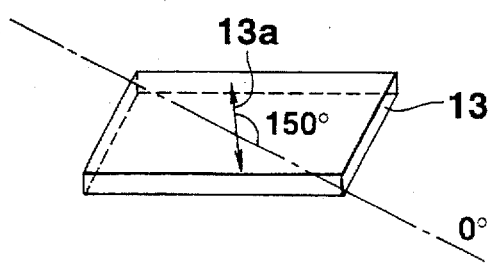

As shown in FIGS. 3E and 4E, the transmission axis, 13a, of the lower polarization plate 13 intersects the aligning treatment direction 8a at 150 degrees. That is, the transmission axis 13a of the lower polarization plate 13 and the transmission axis 14a of the upper polarization plate 14 intersect each other at approximately 15 degrees.

As shown in FIGS. 3B and 4B, the upper retardation plate 17 is arranged in such a way that its axis of the largest refraction index (drawing axis), 17a, on the plane intersects the aligning treatment direction 8a at 75 degrees.

As shown in FIGS. 3C and 4C, the lower retardation plate 16 is arranged in such a way that its axis of the largest refraction index (drawing axis), 16a, on the plane intersects the aligning treatment direction 8a at 150 degrees (or the drawing axis 16a becomes parallel to the transmission axis 13a of the lower polarization plate 13).

According to the LCD device having the above-described structure, the aligned state of the liquid crystal molecules is changed by controlling the voltage applied between the pixel electrodes 3 and the opposing electrode 7. In accordance with a change in the aligned state of the liquid crystal molecules, the total birefringence effect of the retardation plates 16 and 17 and the liquid crystal 11 change, thus altering the retardation for each wavelength. Lights of individual wavelengths become different polarized states wavelength by wavelength in accordance with the change in retardation for each wavelength. As a result, the wavelength distribution of the light outgoing from the upper polarization plate 14 varies in accordance with the change in the voltage applied between the pixel electrodes 3 and the opposing electrode 7, and the display color varies accordingly. That is, the display color can be controlled by controlling the birefringence by changing the applied voltage.

The change in the retardation of the liquid crystal 11 depends on Δn.d. When Δn.d is too large, the display color drastically changes with respect to a change in applied voltage. When Δn.d is too small, on the other hand, the display color hardly changes even if the applied voltage is changed.

According to this embodiment, the use of the liquid crystal 11 whose Δn.d is equal to or greater than 0.7 μm and less than 1.1 μm and the optical arrangement as shown in FIGS. 3A through 4E allows red, green, blue, black and white to be displayed or ensures a so-called full-color display. In addition, the contrast is high and the color purities is excellent.

As the twist angle of the liquid crystal molecules is as small as about 90 degrees, the response speed is fast enough to display motion pictures or the like. It is possible to twist the molecules of almost every liquid crystal, thus ensuring a wider selection of the liquid crystal materials and the materials for the aligning films.

Further, the presence of the retardation plates 16 and 17 widens the field of view of the LCD device.

As Δn.d is less than 1.1 μm, which is relatively small, it is not easy for the display color to change due to a minute change in the liquid crystal layer thickness d, a change in supply voltage and the like, caused by a variation in the manufacturing processes. It is therefore possible to stably display the desired color image and widen the field of view.

A description will now be given of the specific examples of the LCD device according to the first embodiment and some comparative examples.

Specific Example 1

As the liquid crystal 11, BDH-TL215, a product by Merck & Co., Inc., (hereinafter called first liquid crystal) was used. The N-I point of this liquid crystal was 83° C. and Δn was 0.204, the viscosity was 44 cp, and the pitch P was 73 μm. The liquid crystal layer thickness d was set to 4.63 μm, and Δn.d to 0.945 μm. The ratio of unit transmittivity of the polarization plates 13 and 14 was 47%, the degree of polarization was 95%, and the reflector 15 used was obtained by vapor-depositing aluminum on the bottom of the lower polarization plate 13. The lower retardation plate 16 used had Δn.d of 370 nm and an Nz value of 0.3. The upper retardation plate 17 used likewise had Δn.d of 370 nm and an Nz value of 0.3.

Figure 5:
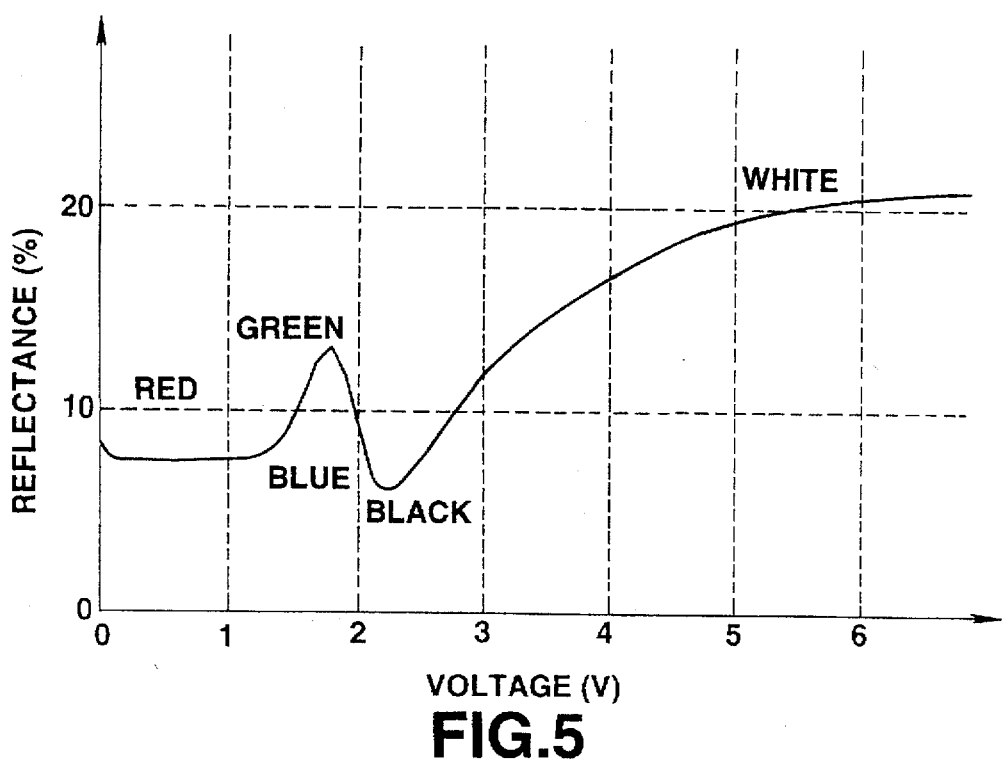
FIG. 5 is a graph showing the relationship among an applied voltage, a reflectance and a display color in the LCD device according to the first embodiment of this invention.
Figure 6:
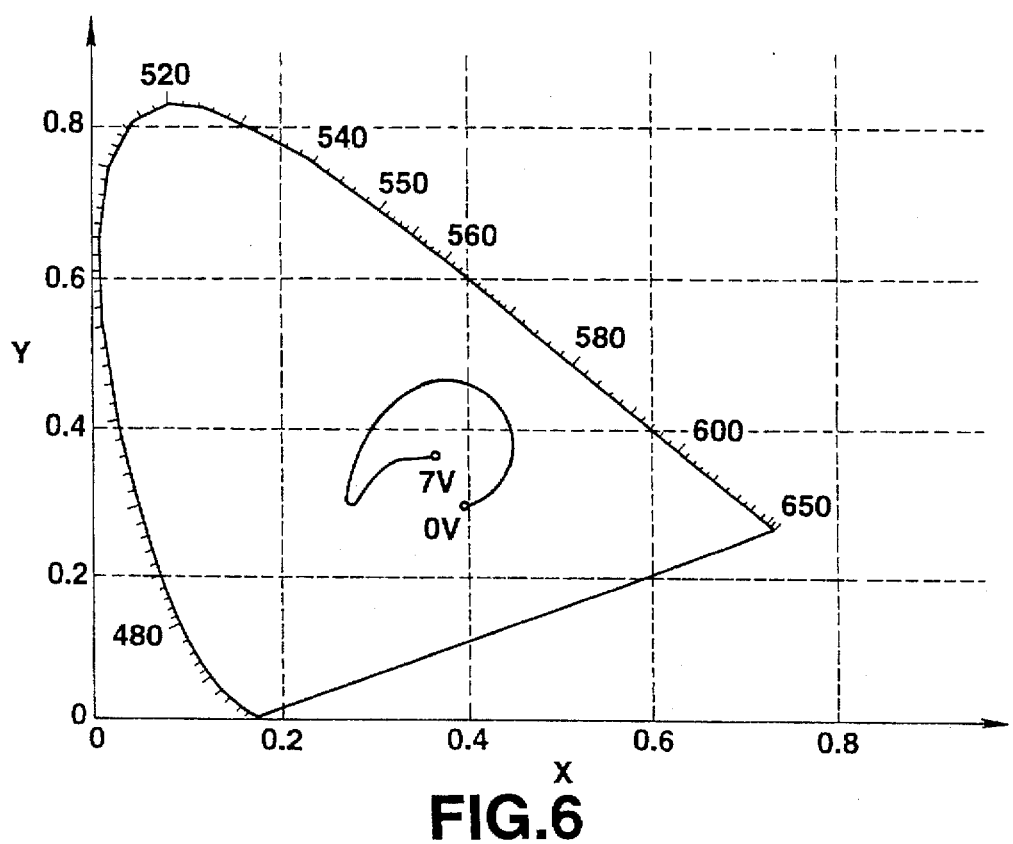
FIG. 6 is a chromaticity diagram of display colors of the LCD device according to the first embodiment.
Figure 7A:
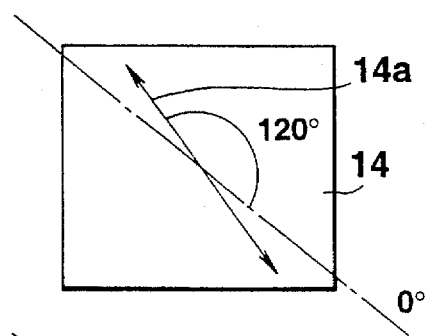
FIGS. 7A–7E are plan views for explaining the directions of the aligning treatments of upper and lower aligning films, the positions of the transmission axes of the upper and lower polarization plates, and the position of the drawing axis of a retardation plate in an LCD device according to a second embodiment of this invention.
Figure 7B:
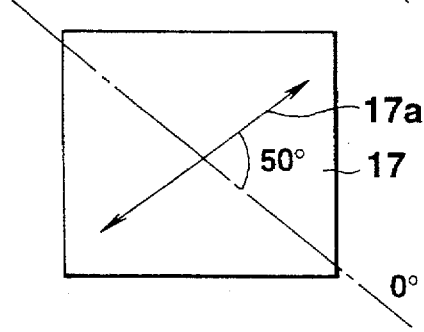
Figure 7C:
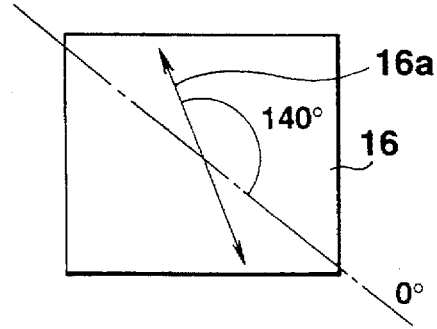
Figure 7D:
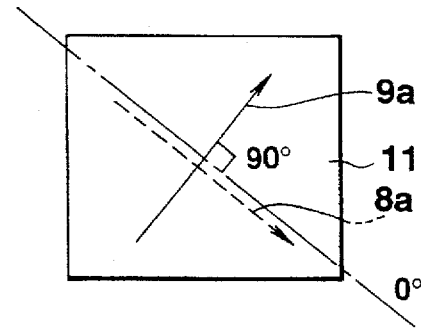
Figure 7E:
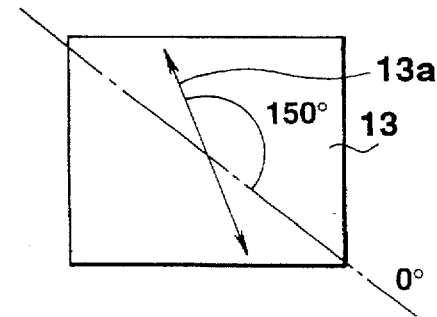
Figure 8A:
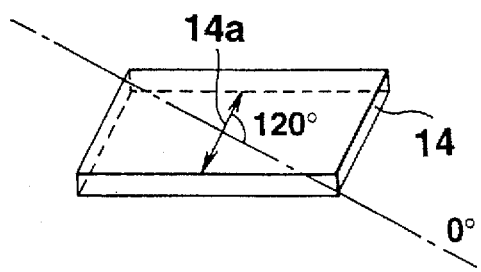
FIGS. 8A–8E are perspective views for explaining the directions of the aligning treatments of upper and lower aligning films, the positions of the transmission axes of the upper and lower polarization plates, and the position of the drawing axis of the retardation plate in the LCD device according to the second embodiment of this invention.
Figure 8B:
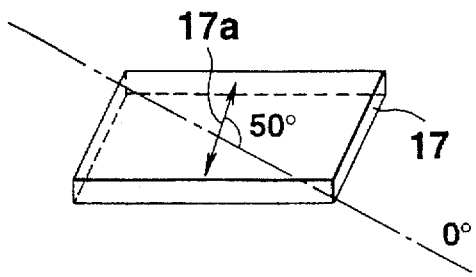
Figure 8C:
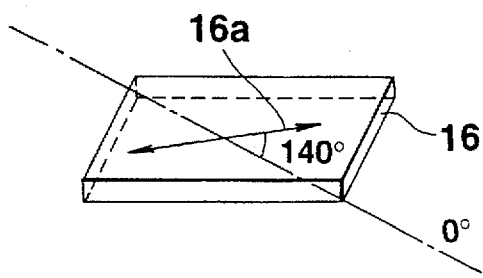
Figure 8D:
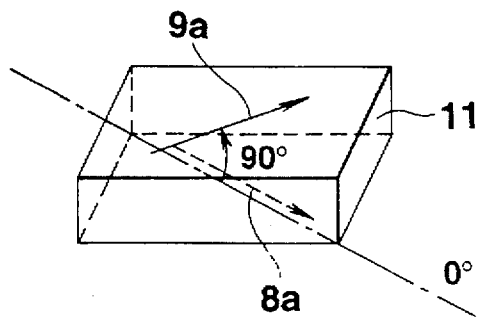
Figure 8E:
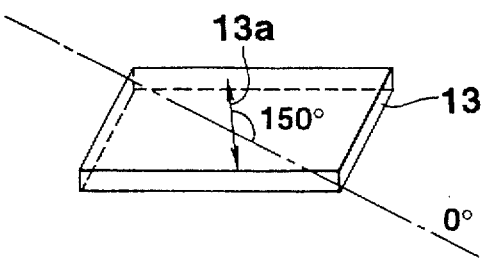

FIG. 5 shows the relationship among the applied voltage, the reflectance and the display color in this case, and FIG. 6 presents its chromaticity diagram.

As shown in FIGS. 5 and 6, the display color changes from red, to green, to blue, to black and to white in accordance with a rise in applied voltage, so that the full-color display is ensured. As shown in FIG. 6, the purities of the individual display colors were excellent. The voltage range (0 to 2.2 V) in which the hue changes could clearly be separated from the voltage range (2.2 to 7 V) in which only the luminance changes in a colorless manner, and the luminance in the colorless mode was monotonously increased or decreased in accordance with a change in voltage. In other words, a dependence (wavelength-dependency) of intensity of transmission light through the liquid crystal display device on a wavelength of the transmission light, with a birefringence defined by an aligned state of liquid crystal molecules according to a highest applied voltages, is compensated so as to display substantial white and high brightness. And, the wavelength-dependence of intensity of the transmission light, with a birefringence defined by an aligned state of liquid crystal molecules according to a lower applied voltages, is compensated so as to display colors in accordance with the applied voltage.

The average response was 83 ms, and the contrast was 4.2, which permits the display of a color image with high contrast and a quick response.

Specific Example 2

As the liquid crystal 11, BDH-TL205, a product by Merck & Co., Inc., (hereinafter called second liquid crystal) was used. The N-I point of this liquid crystal was 87° C. and Δn was 0.218, the viscosity was 45 cp, and the pitch P was 69 μm. The liquid crystal layer thickness d was set to 4.63 μm, and Δn.d to 1.01 μm. The other structure is the same as that of the specific example 1.

In this case, the display color also changed from red, to green, to blue, to black and to white in accordance with a rise in applied voltage, ensuring the full-color display. Further, the purities of the individual display colors were excellent. The voltage range (0 to 2.2 V) in which the hue changes could clearly be separated from the voltage range (2.2 to 7 V) in which only the luminance changes in a colorless manner, and the luminance in the colorless mode was monotonously increased or decreased in accordance with a change in voltage.

The average response was 125 ms, and the contrast was 3.8; the response is relatively fast and a color image with high contrast could be displayed.

Comparative Example 1

The first liquid crystal was used as the liquid crystal 11, the liquid crystal layer thickness d was adjusted to set Δn.d to 1.131, and the other structure was the same as that of the specific example 1.

While the LCD device with this structure could display a plurality of colors, irregularity occurred in the display colors and the display color with respect to the applied voltage was unstable, making it difficult to provide the practical full-color display.

Comparative Example 2

The first liquid crystal was used as the liquid crystal 11, Δn.d was set to 0.67, and the other structure was the same as that of the specific example 1.

The LCD device with this structure had a difficulty in displaying a plurality of colors, and failed to provide the full-color display.

It is apparent from the above-discussed specific examples and comparative examples that since Δn.d of the liquid crystal 11 is set between 0.7 μm and 1.1 μm, the 2-axis retardation plate is used as the retardation plates 16 and 17, and the optical arrangement as illustrated in FIGS. 3A to 4E is employed in the first embodiment, the LCD device capable of displaying full-color images with high color purities can be obtained.

Second Embodiment

The second embodiment of this invention will now be discussed.

The basic structure of the LCD device according to this embodiment is the same as the structure of the LCD device of the first embodiment shown in FIGS. 1 and 2.

As shown in FIGS. 7A to 8E, the upper and lower polarization plates 14 and 13 and the upper and lower retardation plates 17 and 16 are arranged in such a manner that the transmission axis 14a of the upper polarization plate 14 intersects the aligning treatment direction 8a of the lower aligning film 8 at 120 degrees, the drawing axis 17a of the upper retardation plate 17 intersects the aligning treatment direction 8a at 50 degrees, the drawing axis 16a of the lower retardation plate 16 intersects the aligning treatment direction 8a at 140 degrees, and the transmission axis 13a of the lower polarization plate 13 intersects the aligning treatment direction 8a at 150 degrees.

Figure 9:
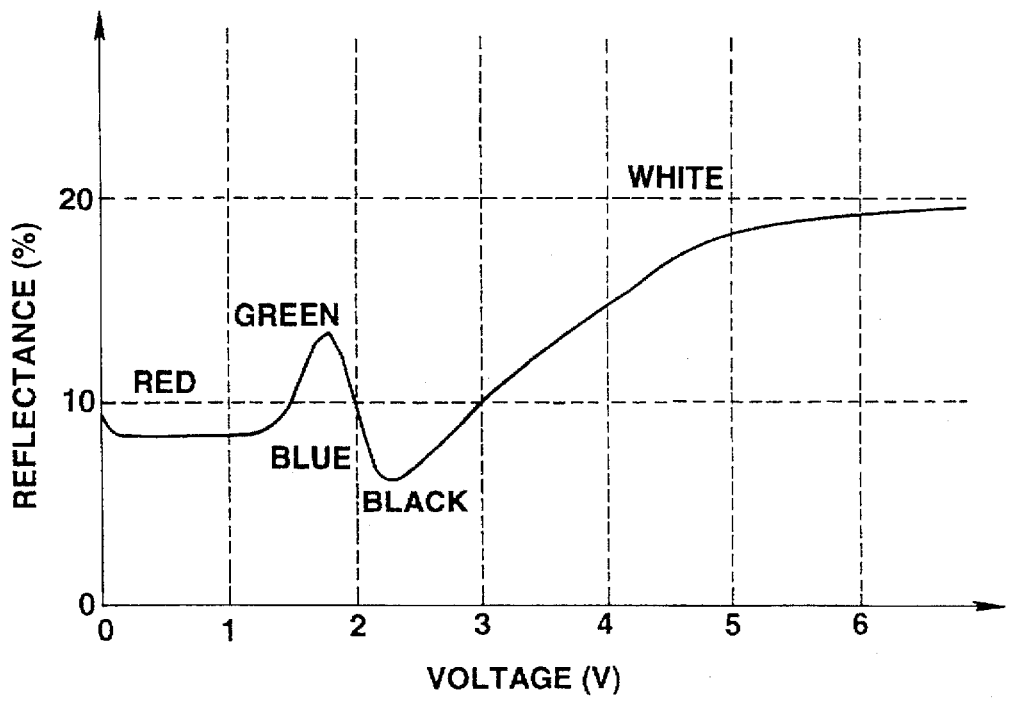
FIG. 9 is a graph showing the relationship among an applied voltage, a reflectance and a display color in the LCD device according to the second embodiment of this invention.
Figure 10:
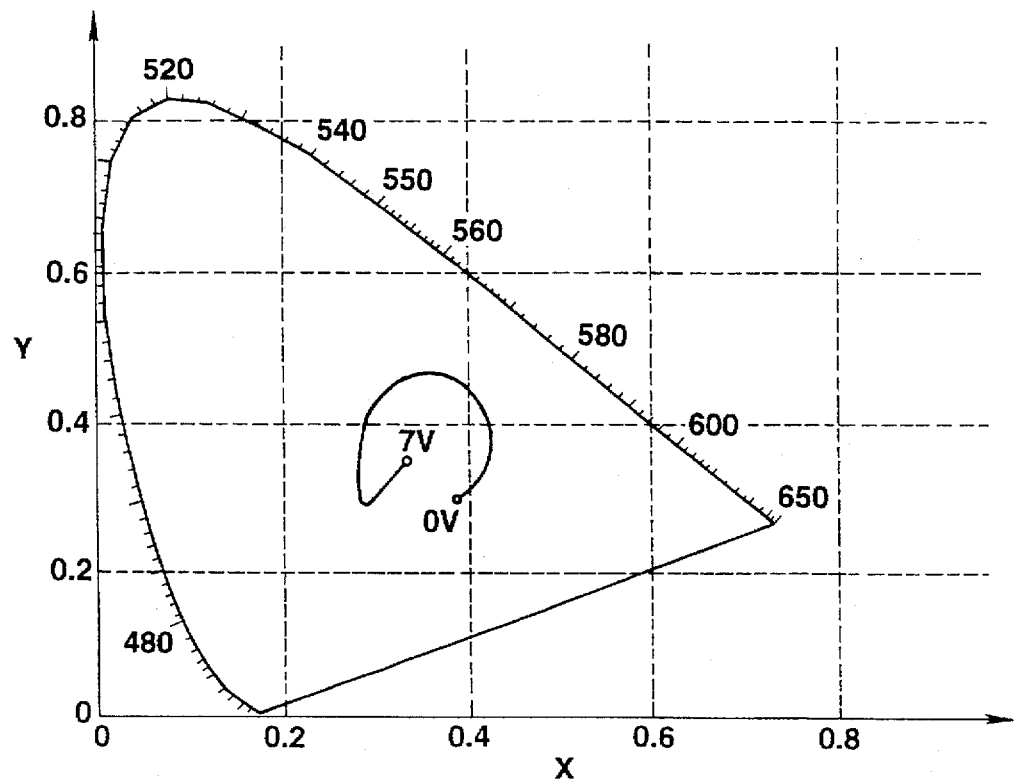
FIG. 10 is a chromaticity diagram of display colors of the LCD device according to the second embodiment.
Figure 11A:
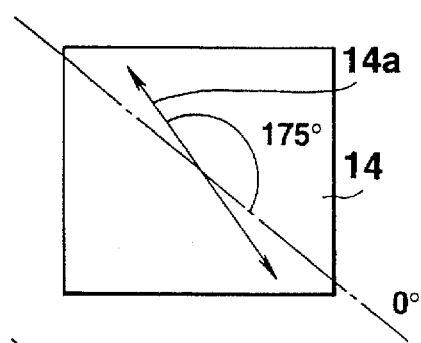
FIG. 11 is a plan view for explaining the directions of the aligning treatments of upper and lower aligning films, the positions of the transmission axes of the upper and lower polarization plates, and the position of the drawing axis of a retardation plate in an LCD device according to a third embodiment of this invention.
Figure 11B:
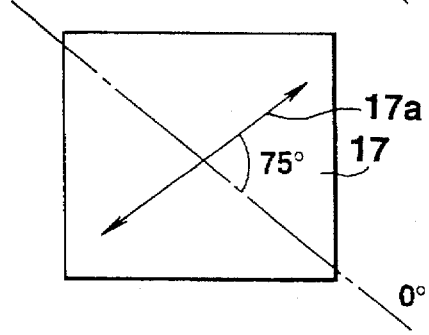
Figure 11C:
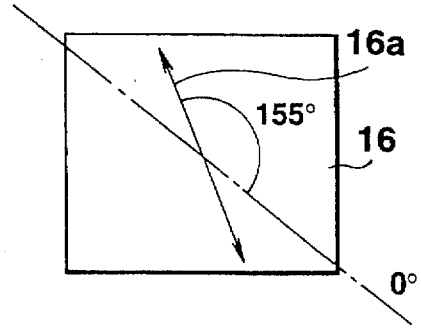
Figure 11D:
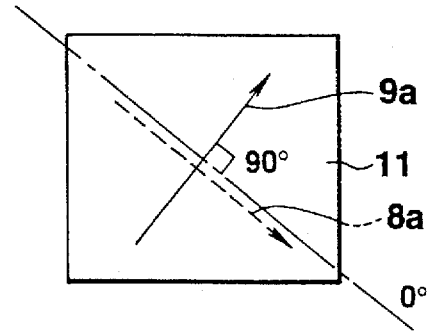
Figure 11E:
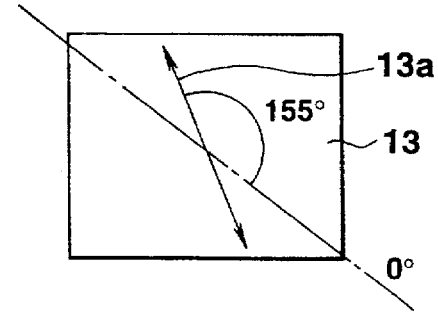
Figure 12A:
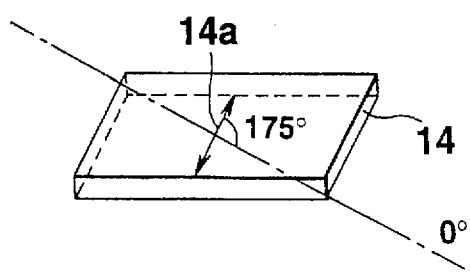
FIG. 12 is a perspective view for explaining the directions of the aligning treatments of upper and lower aligning films, the positions of the transmission axes of the upper and lower polarization plates, and the position of the drawing axis of the retardation plate in the LCD device according to the third embodiment of this invention.
Figure 12B:
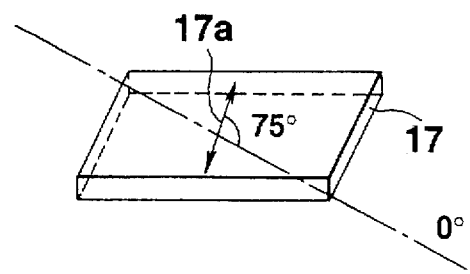
Figure 12C:
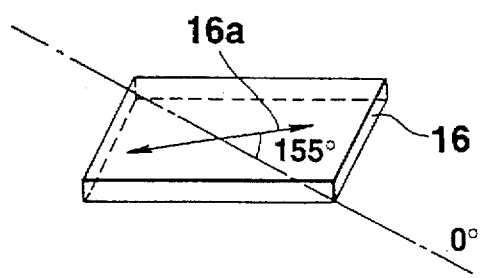
Figure 12D:
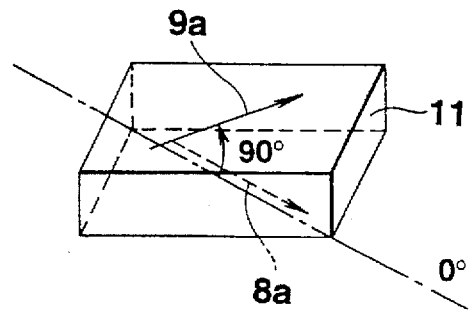
Figure 12E:
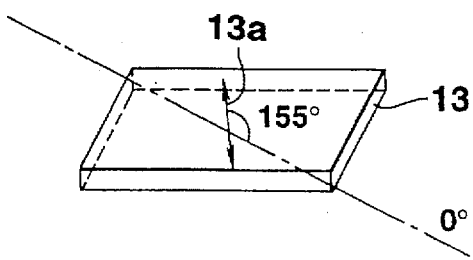

FIG. 9 shows changes in the applied voltage, the reflectance and the display color for the LCD device which has the polarization plates 13 and 14 and the retardation plates 16 and 17 arranged in the above manner with the other structure being identical to that of the specific example 1 of the first embodiment. FIG. 10 presents the chromaticity diagram in this case.

As shown in FIGS. 9 and 10, the LCD device of the second embodiment can display red, green, blue, white and black, thus ensuring the full-color display. The purities of the individual display colors are excellent. The voltage range (0 to 2.3 V) in which the hue changes could clearly be separated from the voltage range (2.3 to 7 V) in which only the luminance changes in a colorless manner, and the luminance in the colorless mode was monotonously increased in accordance with a change in voltage. The average response was 83 ms, and the contrast was 3.1; the response speed is fast and an image with high contrast can be displayed.

Third Embodiment

The third embodiment of this invention will now be explained.

The basic structure of the LCD device according to this embodiment is the same as the structure of the LCD device of the first embodiment shown in FIGS. 1 and 2.

As shown in FIGS. 11A to 12E, the upper and lower polarization plates 14 and 13 and the upper and lower retardation plates 17 and 16 are arranged in such a manner that the transmission axis 14a of the upper polarization plate 14 intersects the aligning treatment direction 8a of the lower aligning film 8 at 175 degrees, the drawing axis 17a of the upper retardation plate 17 intersects the aligning treatment direction 8a at 75 degrees, the drawing axis 16a of the lower retardation plate 16 intersects the aligning treatment direction 8a at 155 degrees, and the transmission axis 13a of the lower polarization plate 13 intersects the aligning treatment direction 8a at 155 degrees.

Figure 13:
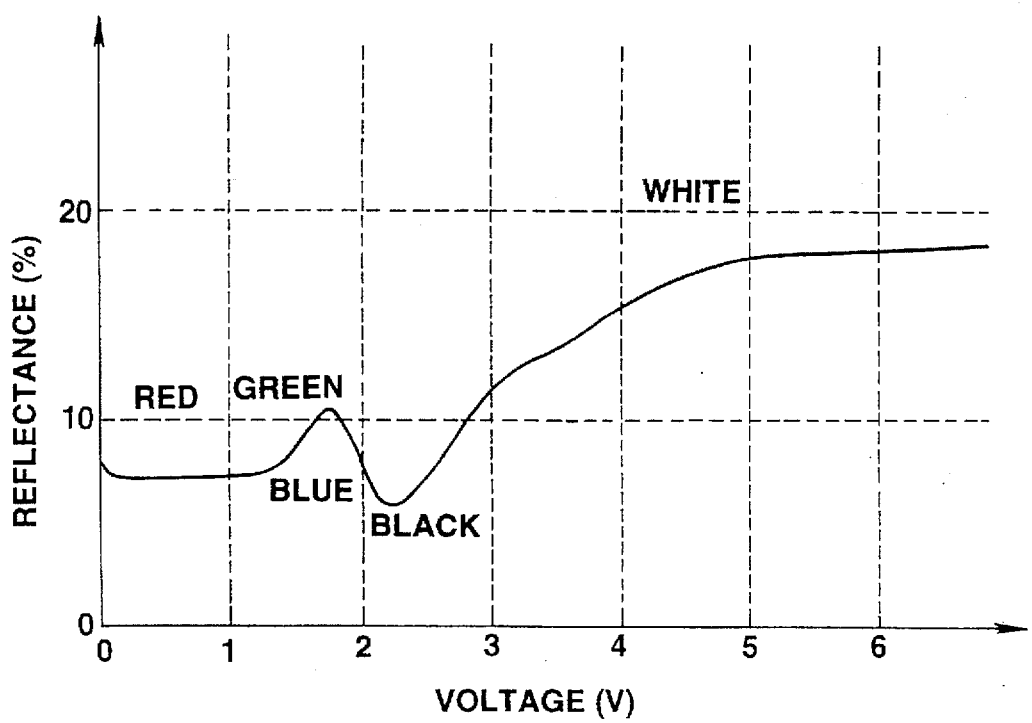
FIG. 13 is a graph showing the relationship among an applied voltage, a reflectance and a display color in the LCD device according to the third embodiment of this invention.
Figure 14:
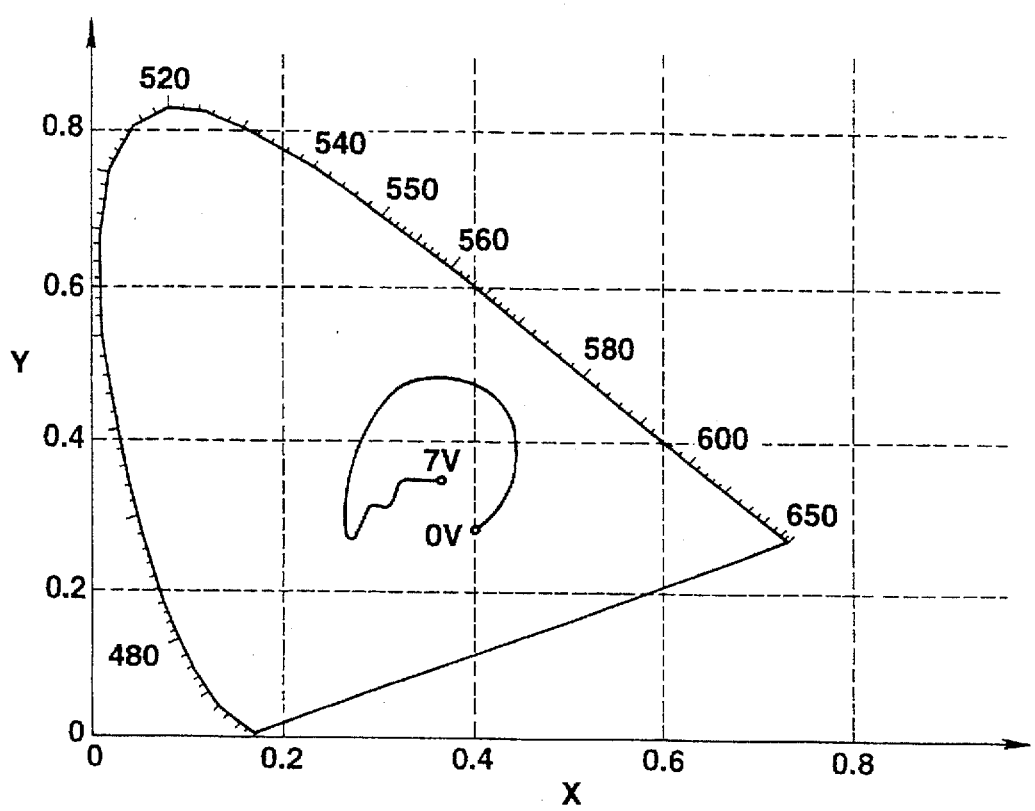
FIG. 14 is a chromaticity diagram of display colors of the LCD device according to the third embodiment.
Figure 15A:
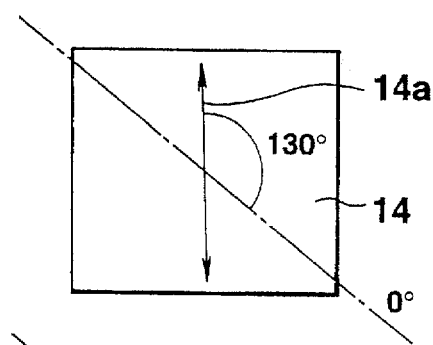
FIG. 15 is a plan view for explaining the directions of the aligning treatments of upper and lower aligning films, the positions of the transmission axes of the upper and lower polarization plates, and the position of the drawing axis of a retardation plate in an LCD device according to a fourth embodiment of this invention.
Figure 15B:
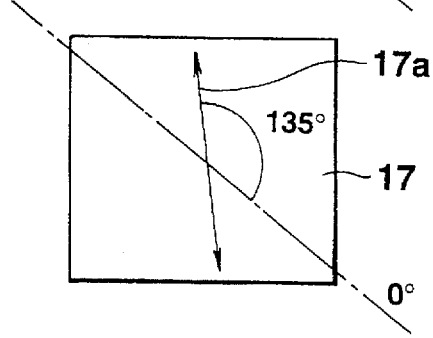
Figure 15C:
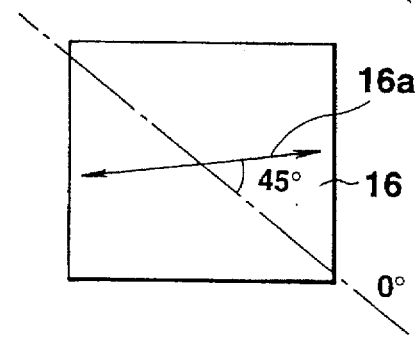
Figure 15D:
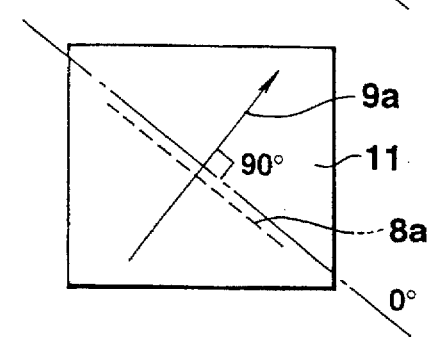
Figure 15E:
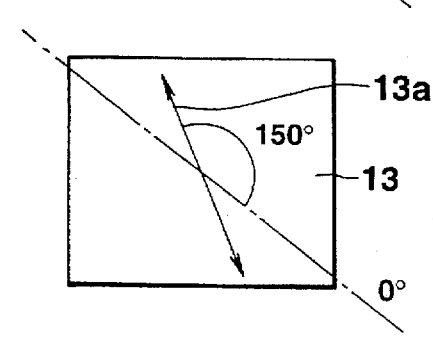
Figure 16A:
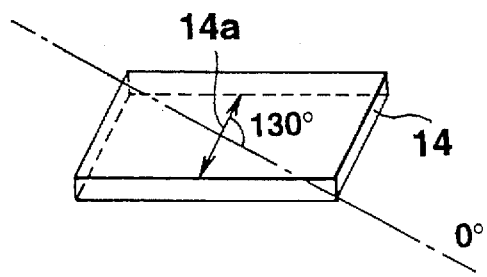
FIG. 16 is a perspective view for explaining the directions of the aligning treatments of upper and lower aligning films, the positions of the transmission axes of the upper and lower polarization plates, and the position of the drawing axis of the retardation plate in the LCD device according to the fourth embodiment of this invention.
Figure 16B:
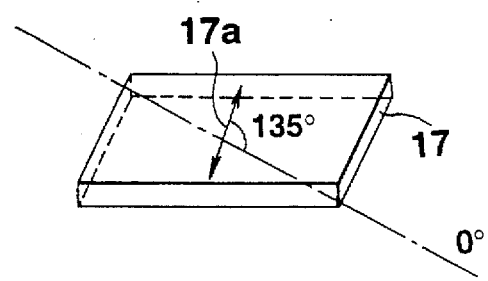
Figure 16C:
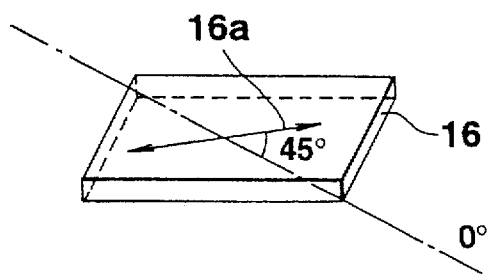
Figure 16D:
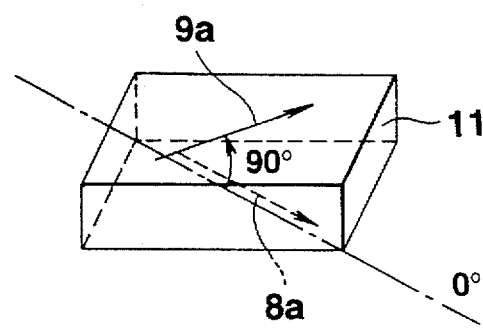
Figure 16E:
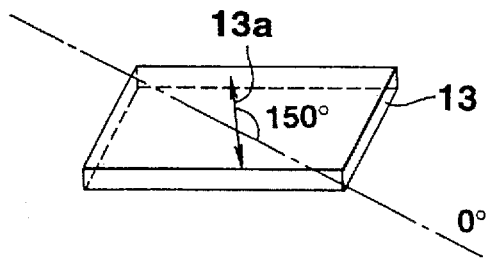
Figure 17A:
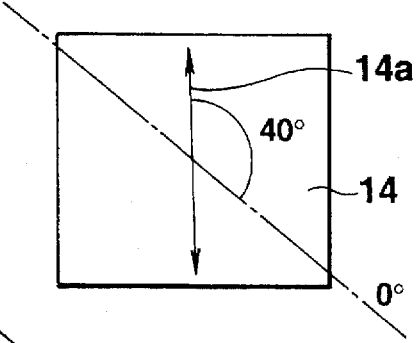
FIG. 17 is a graph showing the relationship among an applied voltage, a reflectance and a display color in the LCD device according to the fourth embodiment of this invention.
Figure 17B:
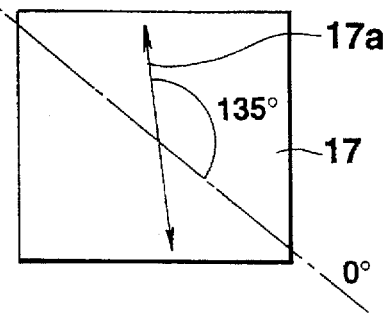
Figure 17C:
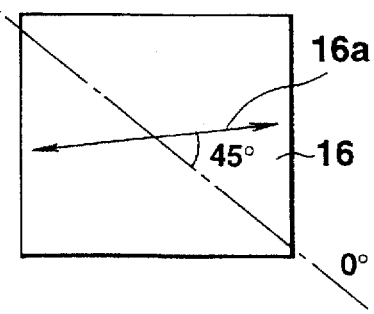
Figure 17D:
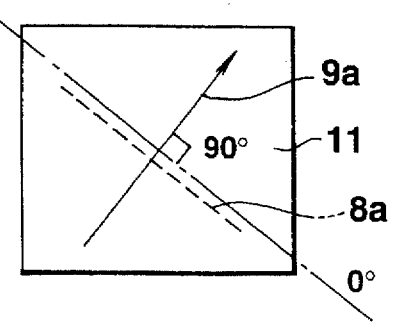
Figure 17E:
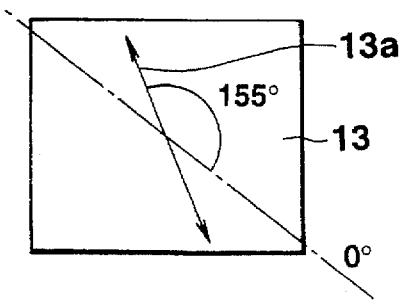
Figure 18A:
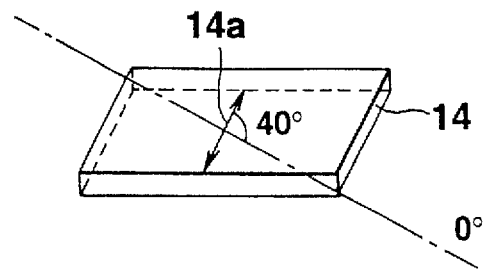
FIG. 18 is a chromaticity diagram of display colors of the LCD device according to the fourth embodiment.
Figure 18B:
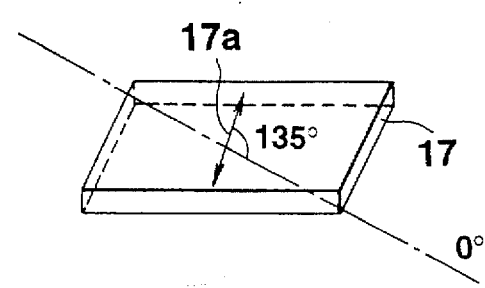
Figure 18C:
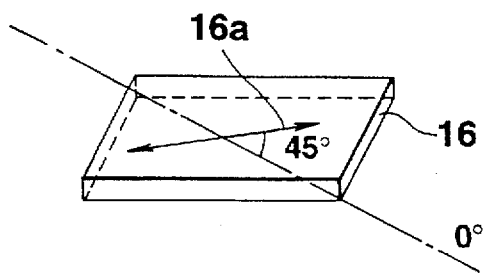
Figure 18D:
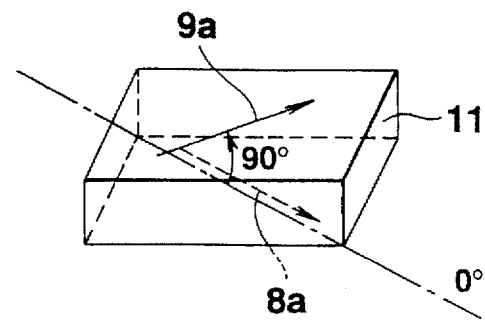
Figure 18E:
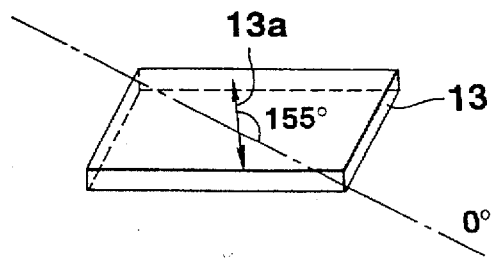

FIG. 13 shows changes in the applied voltage, the reflectance and the display color for the LCD device which has the polarization plates 13 and 14 and the retardation plates 16 and 17 arranged in the above manner with the other structure being identical to that of the specific example 1 of the first embodiment. FIG. 14 presents the chromaticity diagram in this case.

As shown in FIGS. 13 and 14, the LCD device of the third embodiment can display red, green, blue, white and black, thus ensuring the full-color display. The purities of the individual display colors are excellent. The voltage range (0 to 2.3 V) in which the hue changes could clearly be separated from the voltage range (2.3 to 7 V) in which only the luminance changes in a colorless manner, and the luminance in the colorless mode was monotonously increased in accordance with a change in voltage.

The average response was 83 ms, and the contrast was 3.1; the response speed is fast and an image with high contrast can be displayed.

Fourth Embodiment

The fourth embodiment of this invention will now be discussed.

The basic structure of the LCD device according to this embodiment is the same as the structure of the LCD device of the first embodiment shown in FIGS. 1 and 2.

As shown in FIGS. 15A to 16E, the upper and lower polarization plates 14 and 13 and the upper and lower retardation plates 17 and 16 are arranged in such a manner that the transmission axis 14a of the upper polarization plate 14 intersects the aligning treatment direction 8a of the lower aligning film 8 at 130 degrees, the drawing axis 17a of the upper retardation plate 17 intersects the aligning treatment direction 8a at 135 degrees, the drawing axis 16a of the lower retardation plate 16 intersects the aligning treatment direction 8a at 45 degrees, and the transmission axis 13a of the lower polarization plate 13 intersects the aligning treatment direction 8a at 150 degrees.

According to the LCD device with this structure, like the LCD device of the first embodiment, the display color changes from red, to green, to blue, to black and to white in accordance with a rise in applied voltage, so that the full-color display is ensured. The response speed is fast. Further, the voltage range in which the hue changes could clearly be separated from the voltage range in which only the luminance changes in a colorless manner, and the luminance in the colorless mode was monotonously increased or decreased in accordance with a change in voltage.

Some specific examples of the LCD device according to the fourth embodiment will now be discussed.

Specific Example 1

The first and second retardation plates 17 and 16 used had Δn.d of 450 nm and an Nz value of 0.3, and the other structure was the same as that of the specific example 2 of the first embodiment.

In this case, the display color changed from red, to green, to blue, to black and to white in accordance with a rise in applied voltage, thus ensuring the full-color display, as per the specific example 1 of the first embodiment. Further, the voltage range in which the hue changes could clearly be separated from the voltage range in which only the luminance changes in a colorless manner.

The average response was 125 ms, the average reflectance was 14.8%, and the contrast was 4.1; the response speed was excellent and a bright and high-contrast image could be displayed.

Specific Example 2

The first and second retardation plates 17 and 16 used had Δn.d of 450 nm and an Nz value of 0.3, and the other structure was the same as that of the specific example 2 of the first embodiment.

In this case too, the display color changed from red, to green, to blue, to black and to white in accordance with a rise in applied voltage, thus ensuring the full-color display. Further, the voltage range in which the hue changes could clearly be separated from the voltage range in which only the luminance changes in a colorless manner. The average response was 83 ms, the average reflectance was 16.5%, and the contrast was 6.1; the response speed was excellent and a bright and high-contrast image could be displayed.

Fifth Embodiment

The fifth embodiment of this invention will now be discussed.

The basic structure of the LCD device according to this embodiment is the same as the structure of the LCD device of the first embodiment shown in FIGS. 1 and 2.

As shown in FIGS. 17A to 18E, the upper and lower polarization plates 14 and 13 and the upper and lower retardation plates 17 and 16 are arranged in such a manner that the transmission axis 14a of the upper polarization plate 14 intersects the aligning treatment direction 8a of the lower aligning film 8 at 40 degrees, the drawing axis 17a of the upper retardation plate 17 intersects the aligning treatment direction 8a at 135 degrees, the drawing axis 16a of the lower retardation plate 16 intersects the aligning treatment direction 8a at 45 degrees, and the transmission axis 13a of the lower polarization plate 13 intersects the aligning treatment direction 8a at 155 degrees.

In this case too, the full-color images can be displayed and a wide field of view can be secured. The voltage range in which the hue changes could clearly be separated from the voltage range in which only the luminance changes in a colorless manner.

The optical arrangement of the first to fifth embodiments is the most suitable in achieving the present invention. The optical arrangement of this invention is not however limited to the particular arrangement of the first to fifth embodiments.

The present invention can be achieved by twisting the liquid crystal 11 by substantially 90 degrees, inclining the transmission axis 13a of the lower polarization plate 13 with respect to the aligning treatment direction 8a of the lower aligning film 8 by substantially 150 degrees ±10 degrees, inclining the drawing axis 17a of the upper retardation plate 17 with respect to the aligning treatment direction 8a by substantially 145 degrees +15 degrees, inclining the drawing axis 16a of the lower retardation plate 16 with respect to the aligning treatment direction 8a by substantially 60 degrees ±20 degrees, and inclining the transmission axis 14a of the upper polarization plate 14 with respect to the aligning treatment direction 8a by substantially 30 to 50 degrees or 110 to 185 degrees.

It should be noted that the transmission axis 14a of the upper polarization plate 14 with respect to the transmission axis 13a of the lower polarization plate 13 is substantially in the range of 25 degrees ±15 degrees or 120 degrees ±15 degrees.

The positions of the upper and lower retardation plates 17 and 16 may be reversed.

It is desirable that the angle of the intersection between the transmission axes 14a and 13a of the upper and lower polarization plates 14 and 13 in the first to fifth embodiments be substantially 115 degrees or 20 degrees.

Sixth Embodiment

Although the LCD devices of the first to fifth embodiments described above use two retardation plates 16 and 17, the number of the retardation plates is not fixed. A description will now be given of an LCD device which uses a single retardation plate but can still obtain the same advantages as the first to fifth embodiments.

Figure 19:
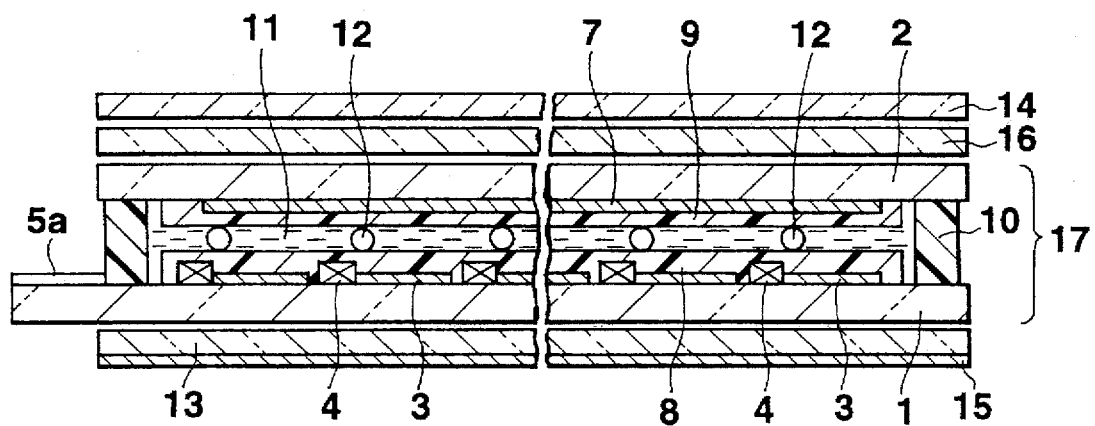
FIG. 19 is a cross-sectional view of an LCD device according to a fifth embodiment of this invention.

FIG. 19 shows the cross-sectional structure of the LCD device of this embodiment, which is the same as the structure shown in FIG. 1 except that the retardation plate 17 is eliminated.

Figure 20A:
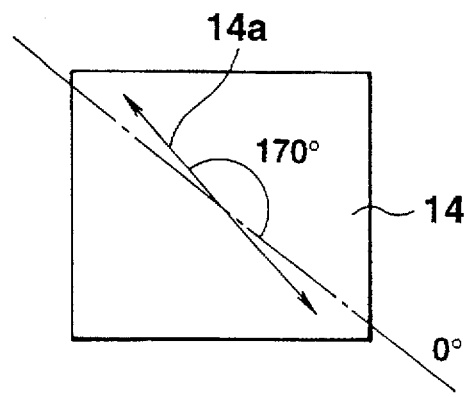
FIG. 20 is a plan view for explaining the directions of the aligning treatments of upper and lower aligning films and the positions of the transmission axes of the upper and lower polarization plates in an LCD device according to the fifth embodiment of this invention.
Figure 20B:
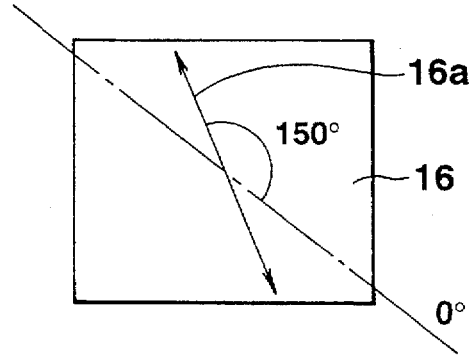
Figure 20C:
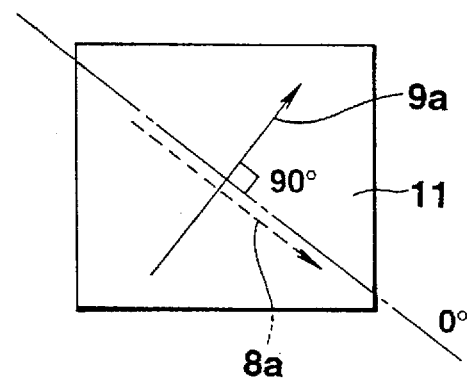
Figure 21A:
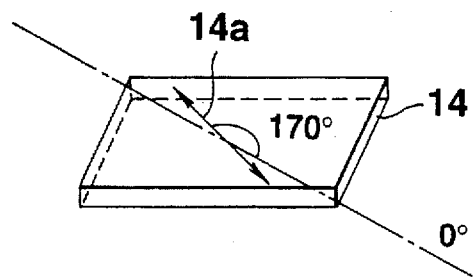
FIG. 21 is a perspective view for explaining the directions of the aligning treatments of upper and lower aligning films and the positions of the transmission axes of the upper and lower polarization plates in the LCD device according to the fifth embodiment of this invention.
Figure 21B:
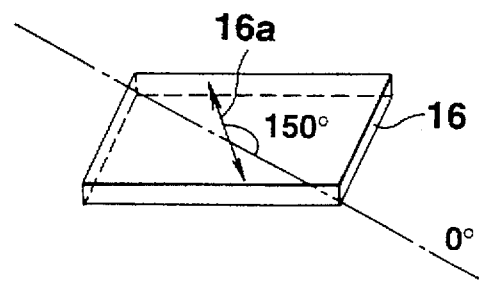
Figure 21C:
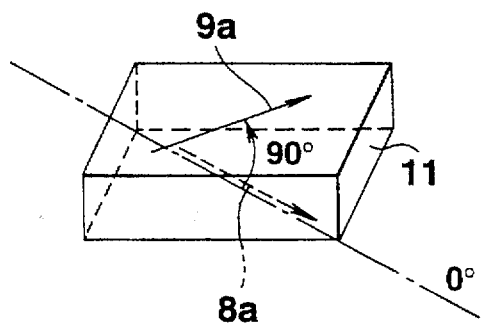

As shown in FIGS. 20C and 21C, the aligning treatment direction 9a of the upper aligning film 9 intersects the aligning treatment direction 8a of the lower aligning film 8 at 90 degrees counterclockwise. Accordingly, the molecules of the liquid crystal 11 are twisted 90 degrees toward the opposing substrate 2 from the TFT substrate 1.

As shown in FIGS. 20A and 21A, the transmission axis 14a of the upper polarization plate 14 intersects the aligning treatment direction 8a of the lower aligning film 8 at 170 degrees.

Figure 20D:
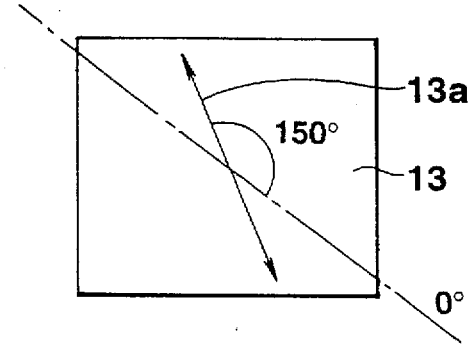
Figure 21D:
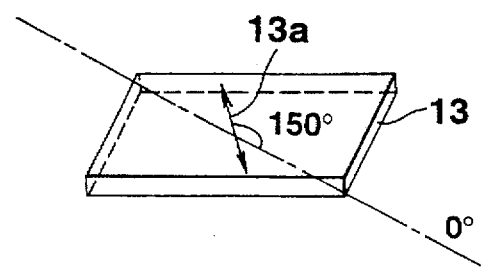

As shown in FIGS. 20D and 21D, the transmission axis 13a of the lower polarization plate 13 intersects the aligning treatment direction 8a at 150 degrees. That is, the transmission axis 13a of the lower polarization plate 13 and the transmission axis 14a of the upper polarization plate 14 intersect each other at approximately 20 degrees.

The retardation plate 16 is arranged in such a way that its drawing axis 16a (the axis of the largest refraction index on the plane) intersects the aligning treatment direction 8a of the aligning film 8 at 150 degrees. That is, the drawing axis 16a is parallel to the transmission axis 13a.

A description will now be given of the specific examples of the LCD device according to the sixth embodiment and some comparative examples.

Specific Example 1

As the liquid crystal 11, the first liquid crystal was used, the liquid crystal layer thickness d was set to 4.63 µm, and $\Delta n.d$ to 0.945 µm. The ratio of unit transmittivity of the polarization plates 13 and 14 was 47%, the degree of polarization was 95%, and the reflector 15 used was obtained by vapor-depositing aluminum on the bottom of the lower polarization plate 13. The retardation plate 16 used had a retardation ((nx−ny).d) of 370 nm and an Nz value of 0.3.

Figure 22:
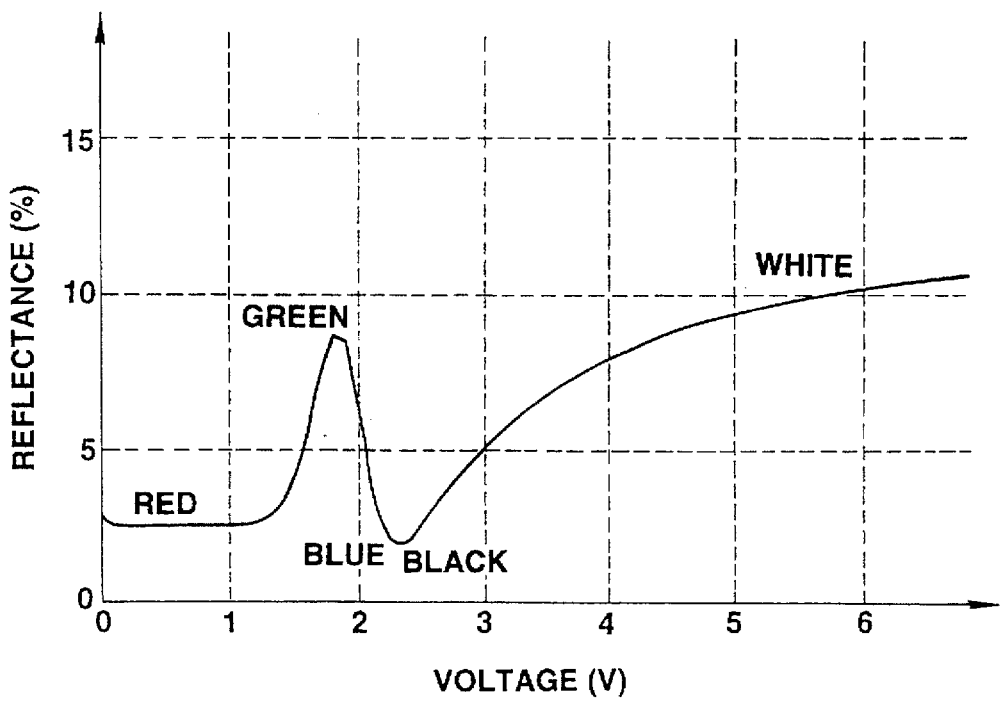
FIG. 22 is a graph showing the relationship among an applied voltage, a reflectance and a display color in the LCD device according to the fifth embodiment of this invention.
Figure 23:
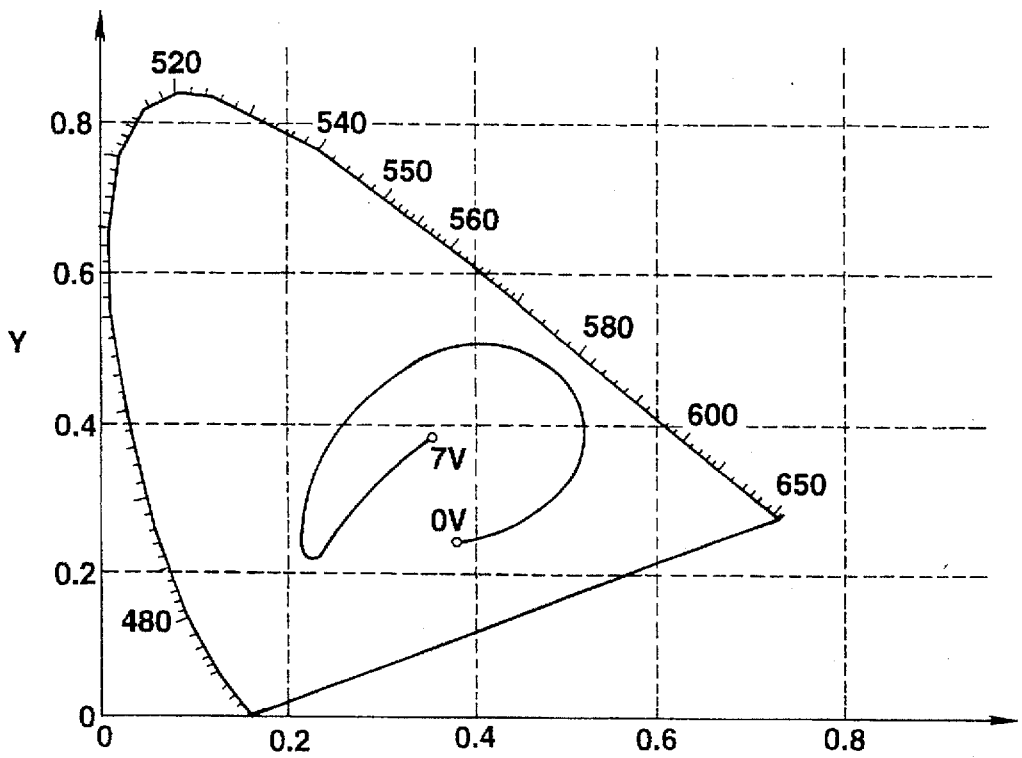
FIG. 23 is a chromaticity diagram of display colors of the LCD device according to the fifth embodiment.
Figure 24A:
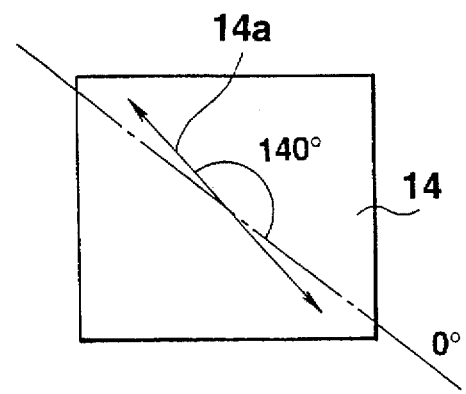
FIG. 24 is a plan view for explaining the directions of the aligning treatments of upper and lower aligning films and the positions of the transmission axes of the upper and lower polarization plates in an LCD device according to a sixth embodiment of this invention.
Figure 24B:
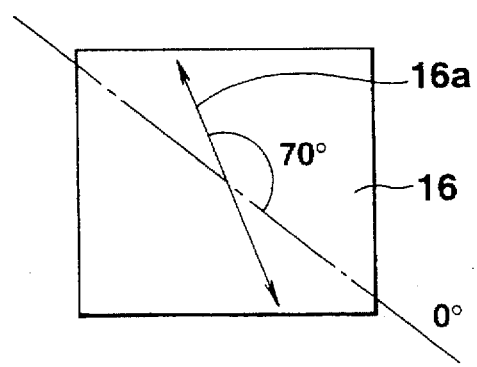
Figure 24C:
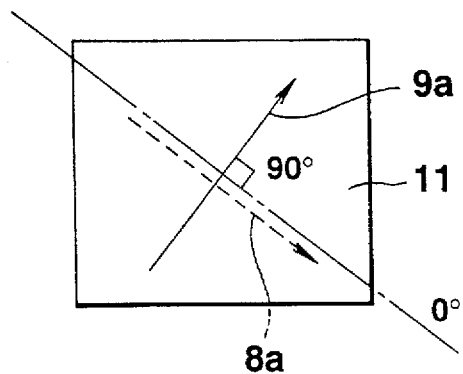
Figure 24D:
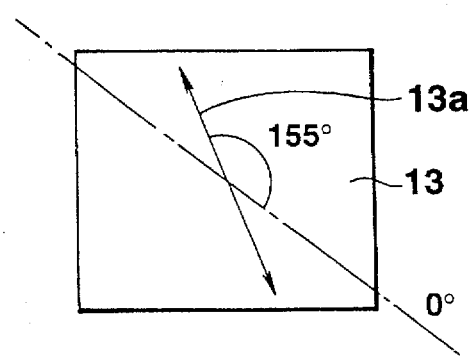
Figure 25A:
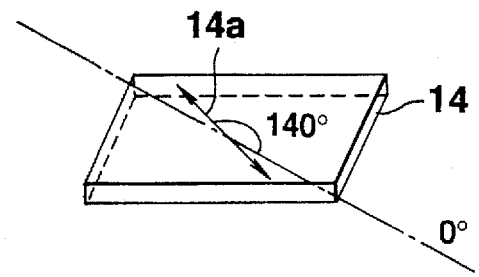
FIG. 25 is a perspective view for explaining the directions of the aligning treatments of upper and lower aligning films and the positions of the transmission axes of the upper and lower polarization plates in the LCD device according to the sixth embodiment of this invention.
Figure 25B:
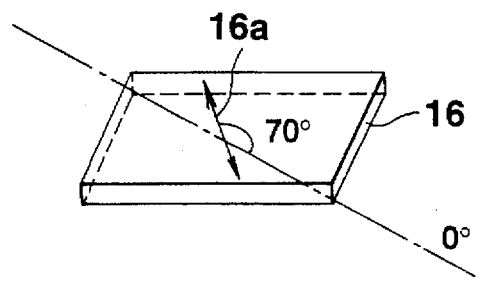
Figure 25C:
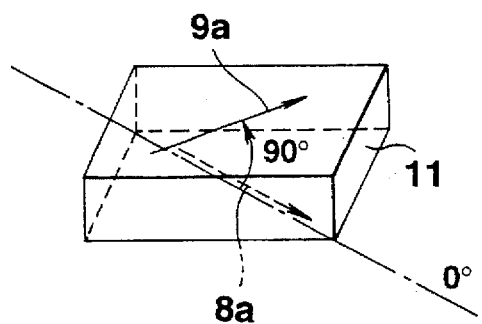
Figure 25D:
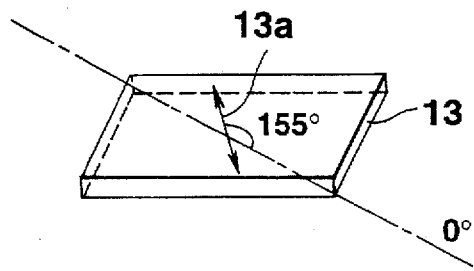

FIG. 22 shows the relationship among the applied voltage, the reflectance and the display color in this case, and FIG. 23 presents its chromaticity diagram.

As shown in FIGS. 22 and 23, the display color changes from red, to green, to blue, to black and to white in accordance with a rise in applied voltage, so that the full-color display is ensured. As shown in FIG. 23, the purities of the individual display colors were excellent.

The voltage range (0 to 2.3 V) in which the hue changes could clearly be separated from the voltage range (2.3 to 7 V) in which only the luminance changes in a colorless manner, and the luminance in the colorless mode was monotonously increased in accordance with a change in voltage.

The average response was 83 ms, and the contrast was 4.2; the response speed is excellent and a color image with high contrast can be displayed.

Specific Example 2

As the liquid crystal 11, the second liquid crystal was used, and the liquid crystal layer thickness d was set to 4.63 µm, and $\Delta n.d$ to 1.01 µm. The other structure is the same as that of the specific example 1.

In this case, the display color also changed from red, to green, to blue, to black and to white in accordance with a rise in applied voltage, thus ensuring the full-color display. Further, the purities of the individual display colors were excellent. The voltage range (0 to 2.3 V) in which the hue changes could clearly be separated from the voltage range (2.3 to 7 V) in which only the luminance changes in a colorless manner, and the luminance in the colorless mode was monotonously increased in accordance with a change in voltage.

The average response was 125 ms, and the contrast was 3.8; the values, though inferior to those of the specific example 1, proved that the response was excellent and a color image with high contrast could be displayed.

Comparative Example 1

Unlike the arrangement shown in FIG. 19, the retardation plate 16 was arranged between the lower polarization plate 13 and the TFT substrate 1, the angle of the intersection between the transmission axis 14a of the upper polarization plate 14 and the aligning treatment direction 8a of the lower aligning film 8 was set to 170 degrees, the angle of the intersection between the transmission axis 13a of the lower polarization plate 13 and the aligning treatment direction 8a was set to 150 degrees, and the angle of the intersection between the drawing axis 16a of the retardation plate 16 and the aligning treatment direction 8a was set to 150 degrees. The other structure was the same as that of the specific example 1.

With the use of the LCD device having this structure, the display color changed from dark red, to dark green, and to light green, failing the full-color display.

Comparative Example 2

The second liquid crystal was used as the liquid crystal 11, the liquid crystal layer thickness d was adjusted to set $\Delta n.d$ to 1.13, and the other structure was the same as that of the specific example 1.

While the LCD device with this structure could display a plurality of colors, irregularity occurred in the display colors and the display color with respect to the applied voltage was unstable, making it difficult to provide the practical full-color display.

Comparative Example 3

The first liquid crystal was used as the liquid crystal 11, $\Delta n.d$ was set to 0.67, and the other structure was the same as that of the specific example 1.

The LCD device with this structure failed the full-color display.

It is apparent from the above-discussed specific examples and comparative examples that the LCD device of this embodiment has a fast response speed and can display a full-color image with excellent color purities.

Further, the use of the 2-axis retardation plate improves the field of view.

Seventh Embodiment

A color LCD device according to the seventh embodiment of this invention will now be discussed.

The basic structure of the LCD device according to this embodiment is the same as the structure of the LCD device of the sixth embodiment shown in FIG. 19.

As shown in FIGS. 24A to 25D, the upper and lower polarization plates 14 and 13 and the retardation plate 16 are arranged in such a manner that the transmission axis 14a of the upper polarization plate 14 intersects the aligning treatment direction 8a at 140 degrees, the transmission axis 13a of the lower polarization plate 13 intersects the aligning treatment direction 8a at 155 degrees, and the drawing axis 16a of the lower retardation plate 16 intersects the aligning treatment direction 8a at 70 degrees.

Figure 26:
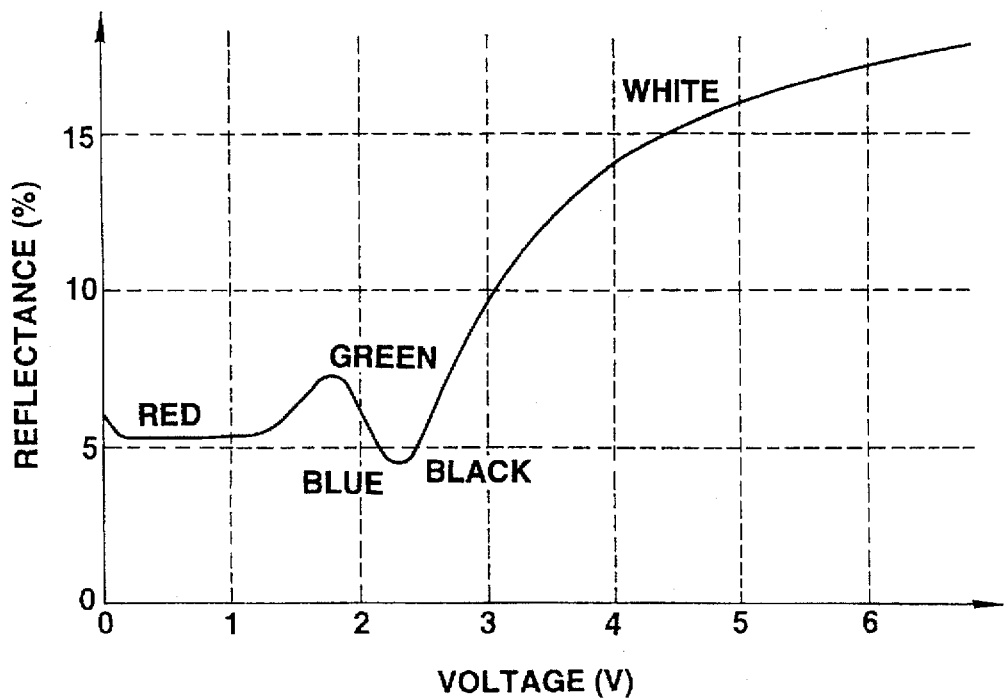
FIG. 26 is a graph showing the relationship among an applied voltage, a reflectance and a display color in the LCD device according to the sixth embodiment.
Figure 27:
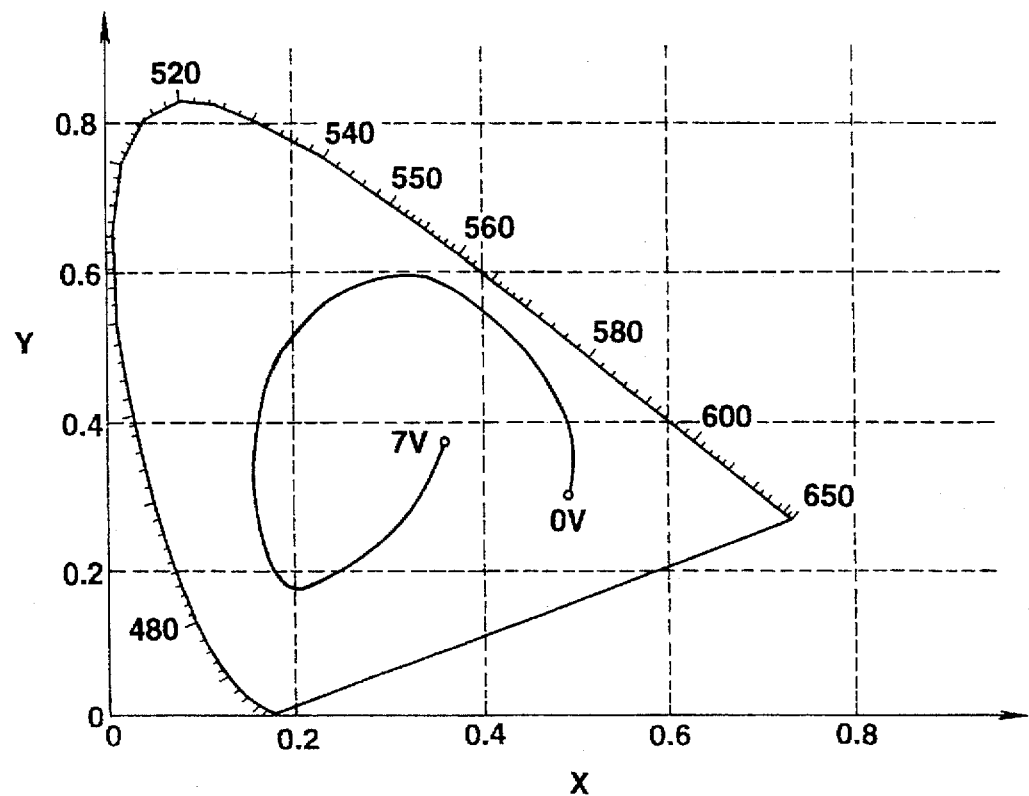
FIG. 27 is a chromaticity diagram of display colors of the LCD device according to the sixth embodiment.
Figure 28A:
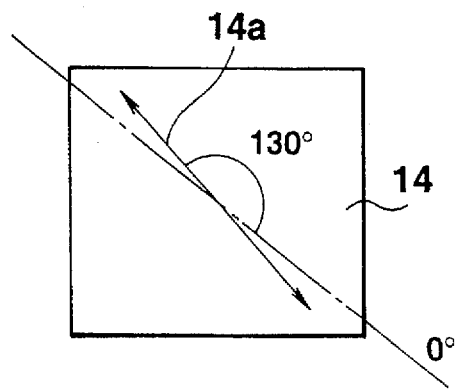
FIG. 28 is a plan view for explaining the directions of the aligning treatments of upper and lower aligning films and the positions of the transmission axes of the upper and lower polarization plates in an LCD device according to a seventh embodiment of this invention.
Figure 28B:
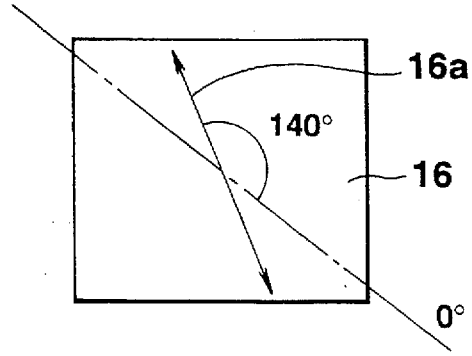
Figure 28C:
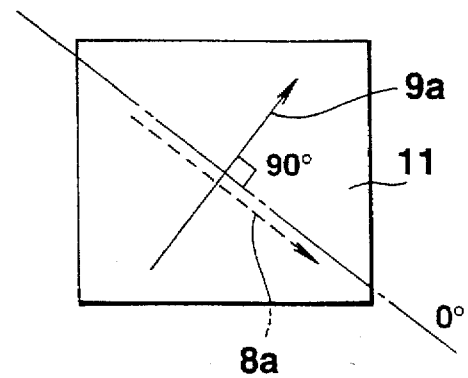
Figure 28D:
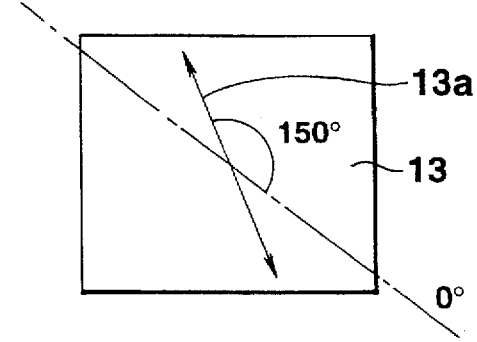
Figure 29A:
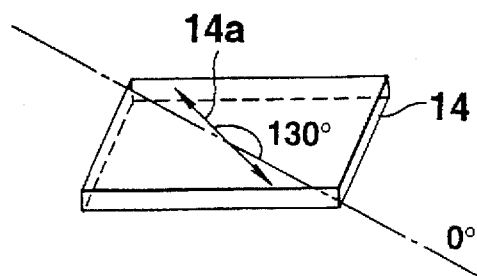
FIGS. 29A–29D perspective views for explaining the directions of the aligning treatments of upper and lower aligning films and the positions of the transmission axes of the upper and lower polarization plates in the LCD device according to the seventh embodiment.
Figure 29B:
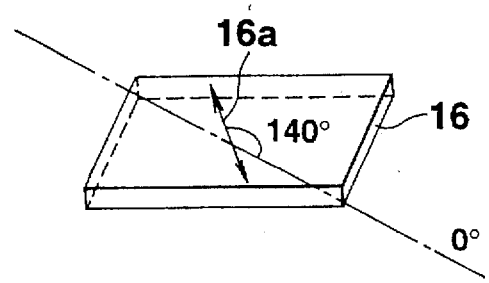
Figure 29C:
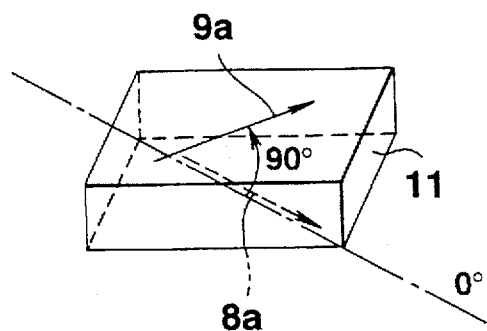
Figure 29D:
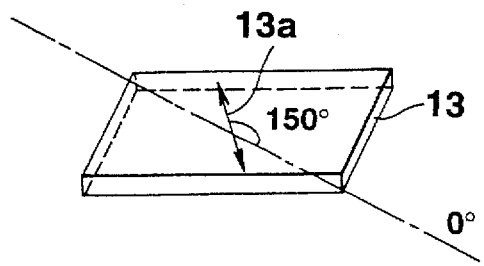

FIG. 26 shows changes in the applied voltage, the reflectance and the display color for the LCD device which has the individual aligning treatment directions 8a and 9a, the transmission axes 13a and 14a and the drawing axis 16a arranged in the above manner with the other structure being identical to that of the specific example 1 of the first embodiment. FIG. 27 presents the chromaticity diagram in this case.

As shown in FIGS. 26 and 27, the LCD device even with this structure can also display red, green, blue, white and black, thus ensuring the full-color display. The purities of the individual display colors are excellent. The voltage range (0 to 2.3 V) in which the hue changes could clearly be separated from the voltage range (2.3 to 7 V) in which only the luminance changes in a colorless manner, and the luminance in the colorless mode was monotonously increased in accordance with a change in voltage.

The average response was 83 ms, and the contrast was 5.4; the response speed is fast and an image with high contrast can be displayed.

Eighth Embodiment

A color LCD device according to the eight embodiment of this invention will now be discussed.

The basic structure of the LCD device according to this embodiment is the same as the structure of the LCD device of the sixth embodiment shown in FIG. 19.

As shown in FIGS. 28A to 29D, the upper and lower polarization plates 14 and 13 and the retardation plate 16 are arranged in such a manner that the transmission axis 14a of the upper polarization plate 14 intersects the aligning treatment direction 8a at 130 degrees, the transmission axis 13a of the lower polarization plate 13 intersects the aligning treatment direction 8a at 150 degrees, and the drawing axis 16a of the lower retardation plate 16 intersects the aligning treatment direction 8a at 140 degrees, and the value of the retardation of the retardation plate 16 is set to 570 nm.

Figure 30:
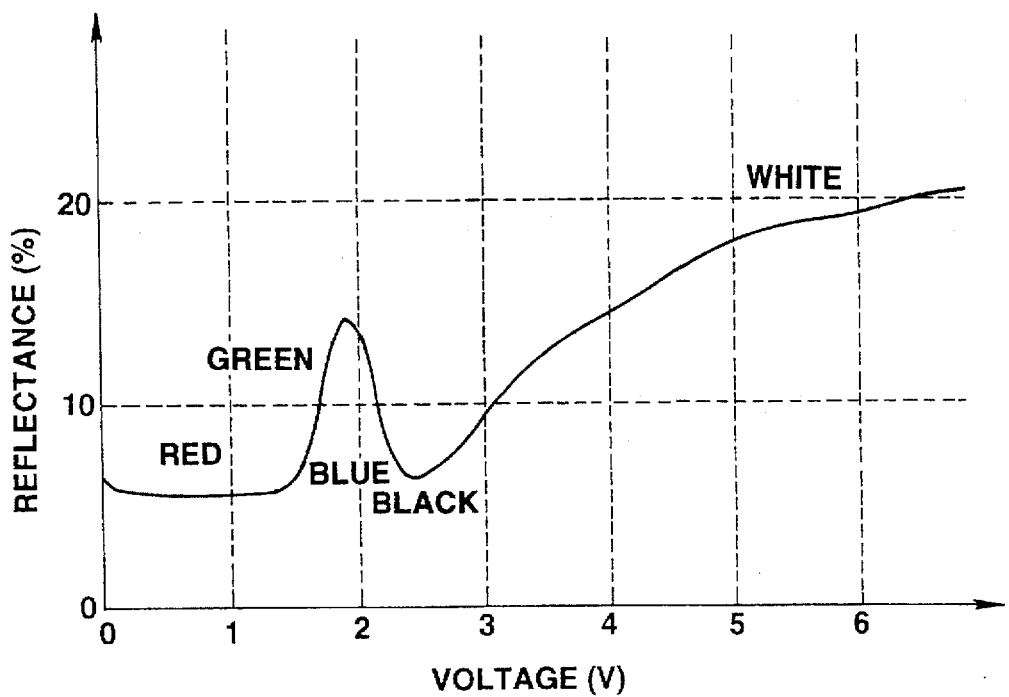
FIG. 30 is a graph showing the relationship among an applied voltage, a reflectance and a display color in the LCD device according to the seventh embodiment of this invention.
Figure 31:
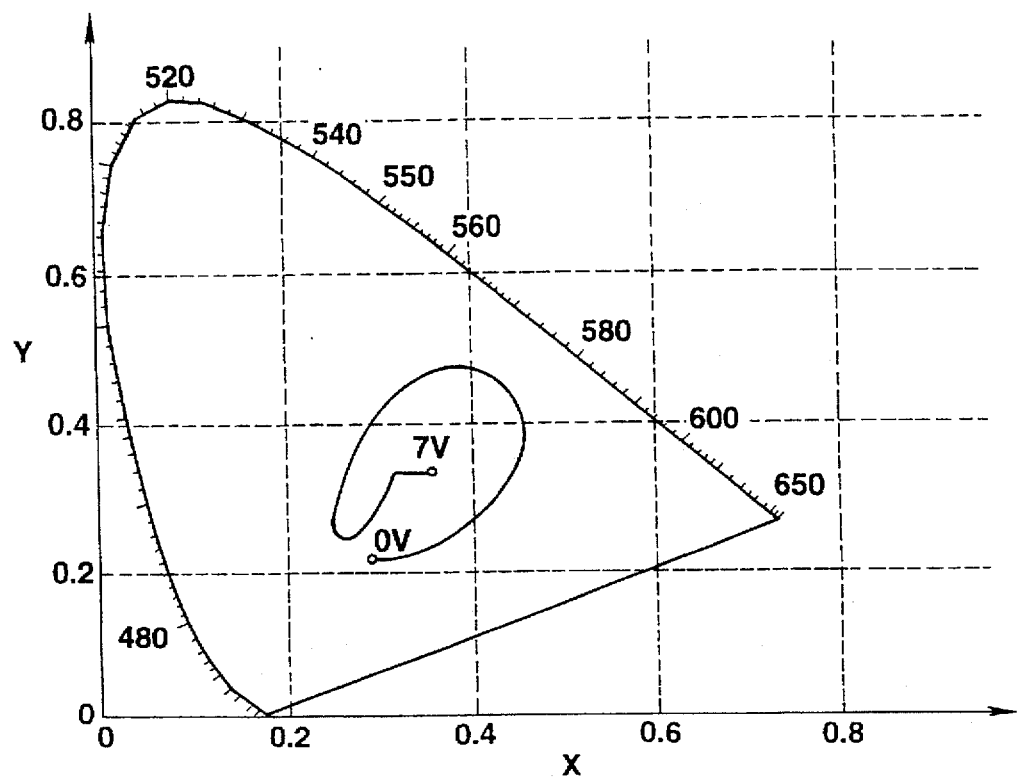
FIG. 31 is a chromaticity diagram of display colors of the LCD device according to the seventh embodiment.

FIG. 30 shows changes in the applied voltage, the reflectance and the display color for the LCD device which has the individual aligning treatment directions 8a and 9a, the transmission axes 13a and 14a and the drawing axis 16a arranged in the above manner with the other structure being the same as that of the specific example 1 of the sixth embodiment. FIG. 31 presents the chromaticity diagram in this case.

As shown in FIGS. 30 and 31, the LCD device even with this structure can also display red, green, blue, white and black with high color purities, thus ensuring the full-color display. The voltage range (0 to 2.4 V) in which the hue changes could clearly be separated from the voltage range (2.4 to 7 V) in which only the luminance changes in a colorless manner, and the luminance in the colorless mode was monotonously increased in accordance with a change in voltage.

The average response was 83 ms, and the contrast was 3.2; the response speed is fast and an image with high contrast can be displayed.

The arrangement of the aligning treatment directions 8a and 9a, the transmission axes 13a and 14a and the drawing axis 16a in the sixth to eighth embodiments is the most suitable in achieving the present invention. This invention is not however limited to the sixth to eighth embodiments.

The present invention can be achieved by twisting the liquid crystal 11 by substantially 90 degrees, arranging the transmission axis 13a of the lower polarization plate 13 to intersect the aligning treatment direction 8a of the lower aligning film 8 by substantially 140 to 165 degrees, arranging the drawing axis 16a of the retardation plate 16 to intersect the aligning treatment direction 8a by substantially 130 to 160 degrees or 60 to 80 degrees, and arranging the transmission axis 14a of the upper polarization plate 14 to intersect the aligning treatment direction 8a by substantially 120 to 18 degrees.

The inclination angle of the transmission axis 14a of the upper polarization plate 14 to the transmission axis 13a of the lower polarization plate 13 is set to substantially 10 to 20 degrees.

Ninth Embodiment

Figure 32:
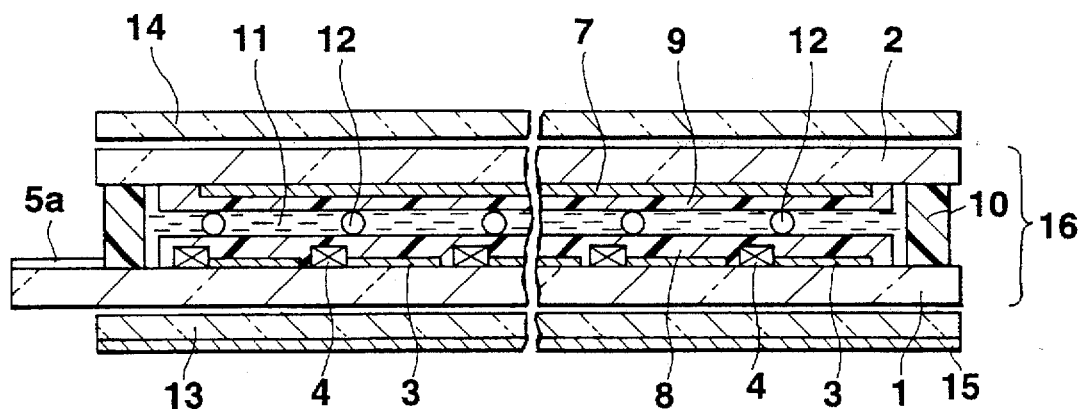
FIG. 32 is a cross-sectional view of an LCD device according to an eighth embodiment of this invention.

Although the LCD devices of the first to eighth embodiments described above use a retardation plate, this invention may take a structure using no retardation plate as shown in FIG. 32.

The LCD device shown in FIG. 32 is the same as the structure shown in FIG. 1 except that the retardation plates 16 and 17 are eliminated.

With the structure in FIG. 32, the aligning treatment direction 9a of the upper aligning film 9 intersects the aligning treatment direction 8a at 90 degrees counterclockwise. Accordingly, the molecules of the liquid crystal 11 are twisted 90 degrees toward the opposing substrate 2 from the TFT substrate 1, as shown in FIGS. 33B and 34B.

Figure 33A:
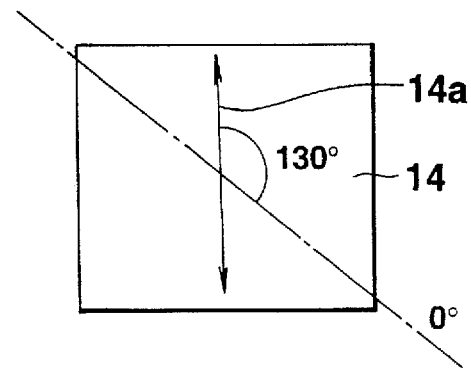
FIGS. 33A–33C are plan views for explaining the directions of the aligning treatments of upper and lower aligning films and the positions of the transmission axes of the upper and lower polarization plates in an LCD device according to the eighth embodiment.
Figure 33B:
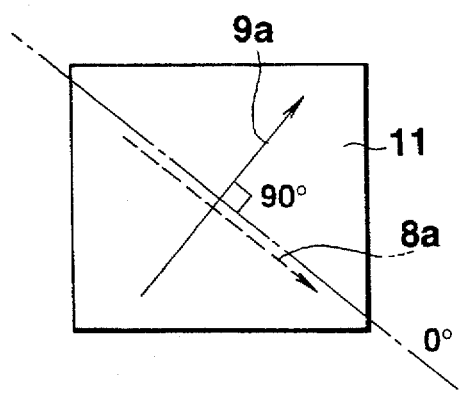
Figure 34A:
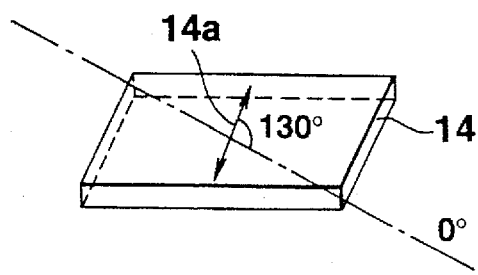
FIGS. 34A–34C are perspective views for explaining the directions of the aligning treatments of upper and lower aligning films and the positions of the transmission axes of the upper and lower polarization plates in the LCD device according to the eighth embodiment.
Figure 34B:
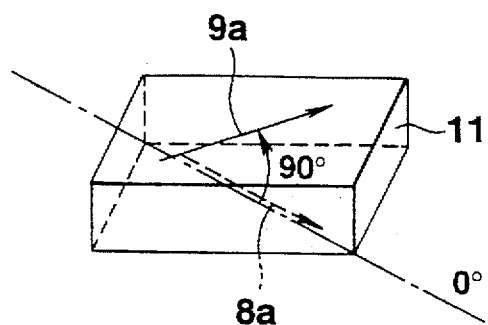

As shown in FIGS. 33A and 34A, the transmission axis 14a of the upper polarization plate 14 intersects the aligning treatment direction 8a of the lower aligning film 8 at 130 degrees.

Figure 33C:
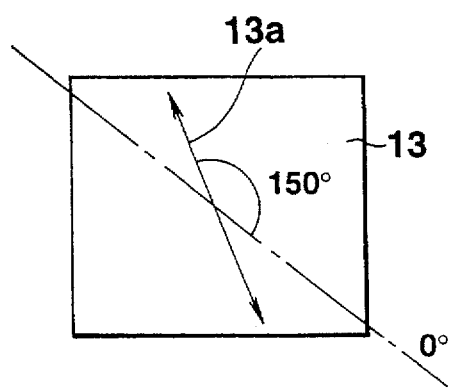
Figure 34C:
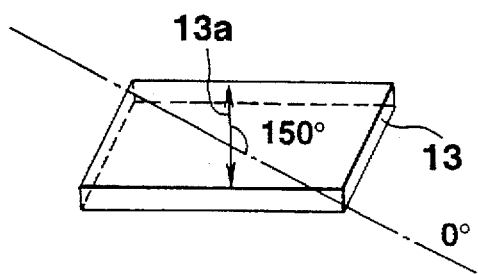

As shown in FIGS. 33C and 34C, the transmission axis 13a of the lower polarization plate 13 intersects the aligning treatment direction 8a at 150 degrees. Therefore, the transmission axis 13a of the lower polarization plate 13 and the transmission axis 14a of the upper polarization plate 14 intersect each other at approximately 20 degrees.

A description will now be given of the specific examples of the LCD device according to the ninth embodiment.

Specific Example 1

In the specific example 1, the first liquid crystal was used as the liquid crystal 11. The liquid crystal layer thickness d was set to 4.63 μm, and Δn.d to 1.01 μm. The ratio of unit transmittivity of the polarization plates 13 and 14 was 44%, the degree of polarization was 99.5%, and the reflector 15 used was obtained by vapor-depositing aluminum on the bottom of the lower polarization plate 13.

Figure 35:
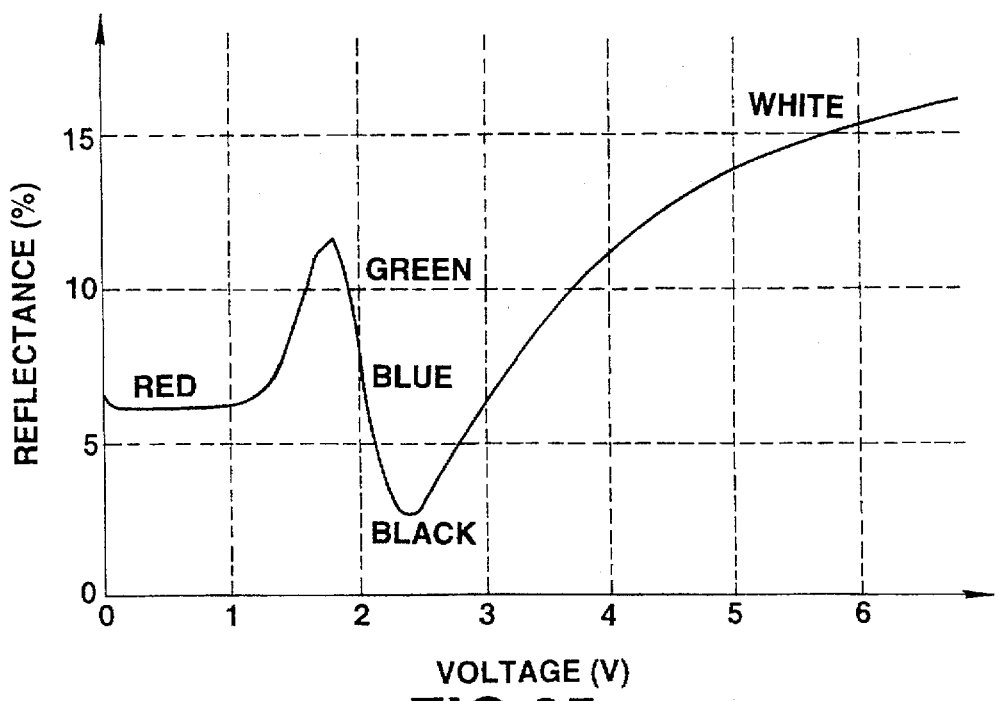
FIG. 35 is a graph showing the relationship among an applied voltage, a reflectance and a display color in the LCD device according to the eighth embodiment.
Figure 36:
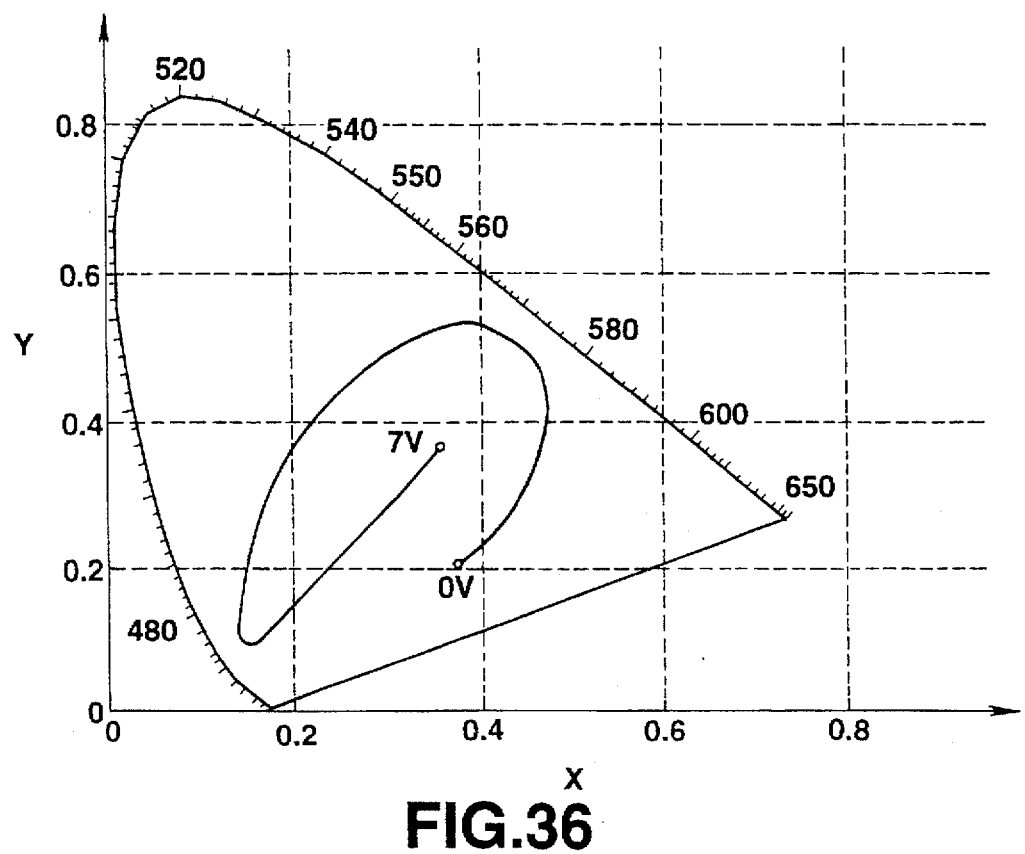
FIG. 36 is a chromaticity diagram of display colors of the LCD device according to the eighth embodiment.

FIG. 35 shows the relationship among the applied voltage, the reflectance and the display color in this case, and FIG. 36 presents its chromaticity diagram.

As shown in FIGS. 35 and 36, the display color changes from red, to green, to blue, to black and to white in accordance with a rise in applied voltage, so that the full-color display is ensured. The hue changed in the area (applied voltage<2.4) where the applied voltage is low, and only the luminance changed in a colorless manner in the area (2.4 V<applied voltage<7) where the applied voltage is high. Therefore, the voltage range in which the hue changes could clearly be separated from the voltage range in which only the luminance changes in a colorless manner, and the control of the display color became very easy. In the voltage range in which only the luminance changes in a colorless manner, the luminance in the colorless mode was monotonously increased in accordance with a change in voltage, thus significantly facilitating the control of the display gradation. Further, the color purities of the display colors were excellent.

Specific Example 2

In the specific example 2, the second liquid crystal was used as the liquid crystal 11, and the liquid crystal layer thickness d was set to 4.63 µm, and Δn.d to 0.945 µm. The other structure is the same as that of the specific example 1.

In this case too, the display color changed from red, to green, to blue, to black and to white in accordance with a rise in applied voltage, thus ensuring the full-color display. The voltage range in which the hue changes could clearly be separated from the voltage range in which only the luminance changes in a colorless manner, and the control of the display color became very easy. In the voltage range in which only the luminance changes in a colorless manner, the luminance in the colorless mode was monotonously increased or decreased in accordance with a change in voltage, thus significantly facilitating the control of the display gradation. Further, the color purities of the display colors were excellent.

Tenth Embodiment

The tenth embodiment of this invention will now be discussed.

Figure 37A:
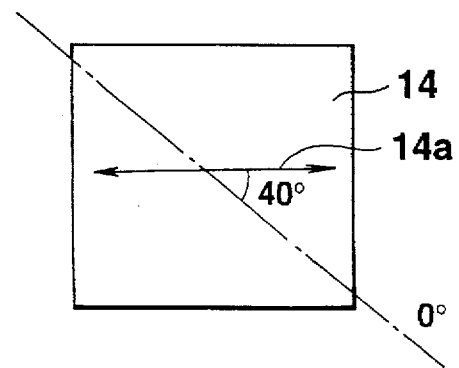
FIGS. 37A–37C are plan views for explaining the directions of the aligning treatments of upper and lower aligning films and the positions of the transmission axes of the upper and lower polarization plates in an LCD device according to a ninth embodiment of this invention.
Figure 37B:
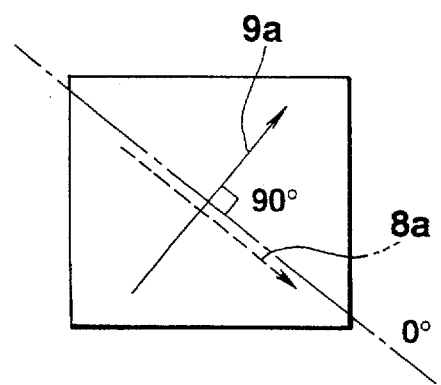
Figure 37C:
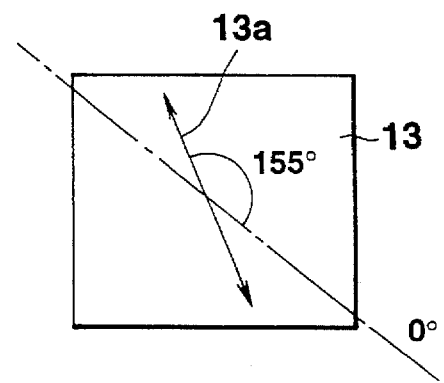
Figure 38A:
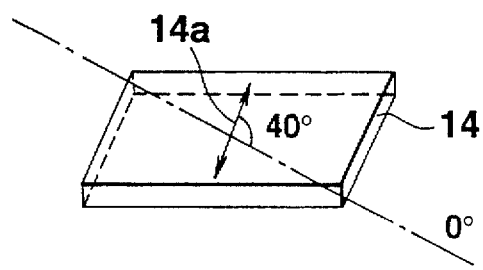
FIGS. 38A–38C are perspective views for explaining the directions of the aligning treatments of upper and lower aligning films and the positions of the transmission axes of the upper and lower polarization plates in the LCD device according to the ninth embodiment.
Figure 38B:
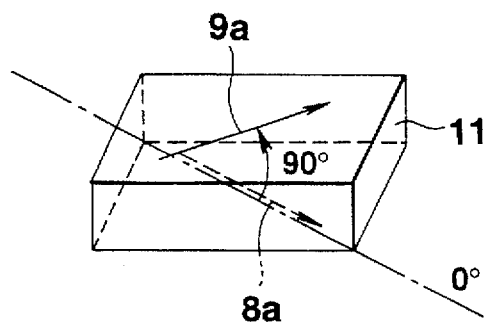
Figure 38C:
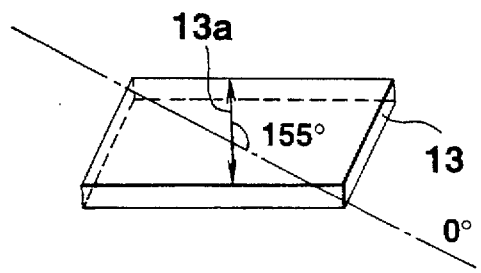

The basic structure of the LCD device according to this embodiment is the same as the structure of the LCD device of the ninth embodiment shown in FIG. 32. The tenth embodiment differs from the ninth embodiment in that the upper and lower polarization plates 14 and 13 are arranged in such a manner that the transmission axis 14a of the upper polarization plate 14 intersects the aligning treatment direction 8a of the lower aligning film 8 at 40 degrees, and the transmission axis 13a of the lower polarization plate 13 intersects the aligning treatment direction 8a at 155 degrees, as shown in FIGS. 37 and 38.

Figure 39:
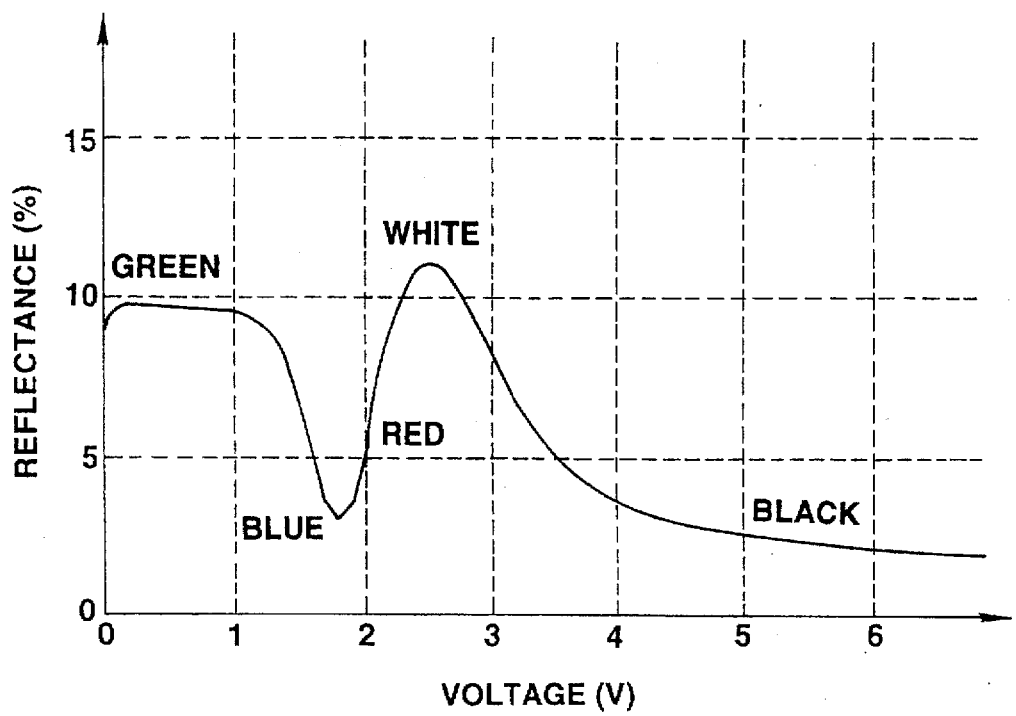
FIG. 39 is a graph showing the relationship among an applied voltage, a reflectance and a display color in the LCD device according to the ninth embodiment.
Figure 40:
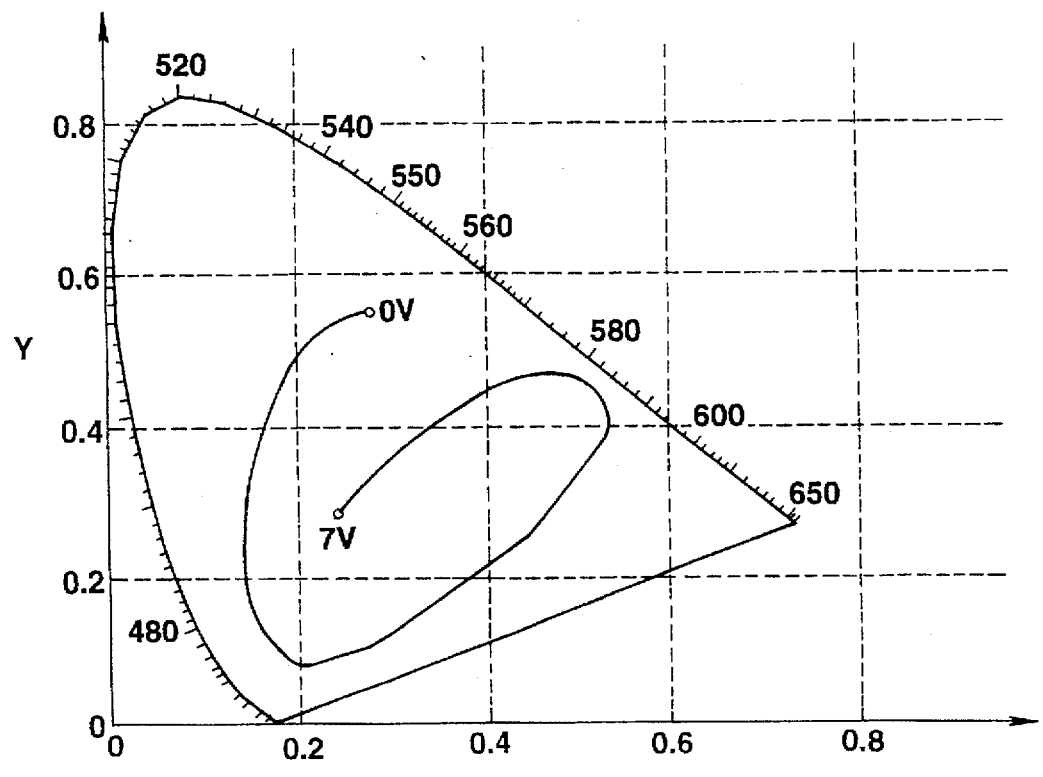
FIG. 40 is a chromaticity diagram of display colors of the LCD device according to the ninth embodiment.

FIG. 39 exemplifies the relationship among the applied voltage, the reflectance and the display color for the specific example of the LCD device according to the tenth embodiment, and FIG. 40 presents the chromaticity diagram in this case.

Those graphs are obtained when the second liquid crystal was used as the liquid crystal 11, the liquid crystal layer thickness d was set to 4.63 µm, the ratio of unit transmittivity of the polarization plates 13 and 14 was 44%, the degree of polarization was 99.5%, and the reflector 15 used was obtained by vapor-depositing aluminum on the bottom of the lower polarization plate 13.

As shown in FIGS. 39 and 40, the display color changed from green, to blue, to red, to white and to black in accordance with a rise in applied voltage, so that the full-color display is ensured. The voltage range (0 to 2.8 V) in which the hue changes could clearly be separated from the voltage range (0 to 7 V) in which only the luminance changes in a colorless manner, and the luminance in the colorless mode was monotonously increased in accordance with a change in voltage.

The LCD devices of the first to tenth embodiments have a first operation range where the color changes in accordance with a change in applied voltage and a second operation range where the luminance (brightness) changes in accordance with a change in applied voltage. Therefore, the color selection and the brightness selection can be controlled separately. This facilitates the control of the display color.

The primary colors, red, green and blue, can be displayed in order in the first operation range, and black and white can be displayed in the second operation range, so that the so-called full-color display becomes possible. Further, the contrast is high and the color purities are excellent.

Eleventh Embodiment

A color LCD apparatus according to the eleventh embodiment, which drives the LCD devices of the first to tenth embodiments will now be discussed.

As shown in FIG. 42, this LCD apparatus comprises a CPU 43 which controls the overall system in accordance with a predetermined program, a program memory 51 in which the operation program of the CPU 43, e.g., an image forming and editing program, is stored, an image memory (display memory) 22 in which image data is written by the CPU 43, a display controller 53 which sequentially reads image data from the image memory 22 under the control of the CPU 43, a conversion table 55 for converting the image data read by the display controller 53 to corresponding digital voltage data, a D/A (Digital-to-Analog) converter 57 for converting the digital voltage data output from the conversion table 55 to an analog voltage signal, an LCD device 23, and a power supply circuit 59 for supplying power to the mentioned individual sections.

An LCD panel 41 has, for example, the structure of the tenth embodiment and has the characteristic to display an applied voltage 0 in green.

Figure 42A:
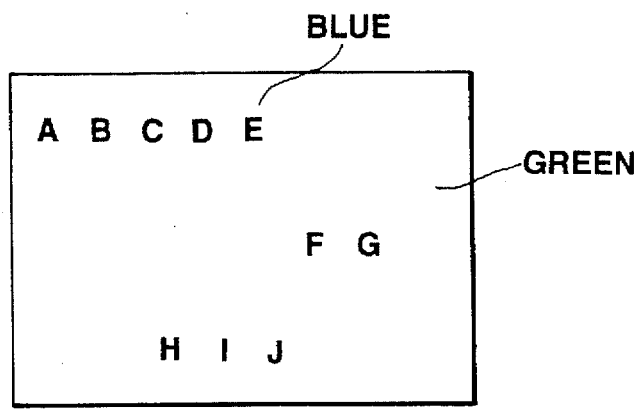
FIGS. 42A through 42C are diagrams exemplifying display images.

The CPU 43 produces text data shown in, for example FIG. 42A, line charts like graphs as show in FIG. 43B and image data like figures as shown in FIG. 43C in accordance with the programs stored in the program memory 51, and writes those data in the image memory 22.

In this embodiment, the background portion of each display image (the portion with the color occupying the largest display area) is displayed in green, while the text (characters and symbols) portion, the line chart portion and the figure portion are displayed in other colors.

The image data produced by the CPU 43, defines the aforementioned display images pixel by pixel, consists of, for example, 3-bit data per pixel. One bit of the image data expresses the luminance of red (R), another one bit expresses the luminance of green (G) and the last one bit expresses the luminance of blue (B). The combined color of those three colors corresponds to the display color at each pixel.

The display controller 53 sequentially reads image data from the image memory 22 for each scan line and outputs the image data to the conversion table 55 under the control of the CPU 43.

As shown in FIG. 43, for example, the conversion table 55 stores digital voltage data corresponding to image data in each memory area expressed by the image data as an address. The conversion table 55 outputs digital voltage data, stored at the location addressed by the image data supplied from the display controller 53.

The D/A converter 57 receives 3-bit digital voltage data supplied from the conversion table 55, converts it to a voltage signal in the range of 0 V to 5 V, and outputs the resultant signal.

The column driver 22 samples one line of analog video signals supplied from the D/A converter 57, and outputs one line of sampled video signals to the data line 49.

The row driver 21 sequentially applies a gate pulse to the gate lines 47 in accordance with the timing signal from the CPU 43. The TFTs 45 connected to the gate line 47 to which the gate pulse is applied is turned on. Analog video signals on the data line 49 are applied to the pixel electrodes 43 connected to the activated TFTs 45.

The row driver 21 disables the gate pulse immediately before the voltage applied to the data line 49 is switched. Then, the TFTs 45 are turned off, and the voltages which have been applied up to that point are held in the pixel capacitors formed by the pixel electrodes 43, the opposing electrode 51 and the liquid crystal 59 lying between both electrodes 43 and 51. As a result, the aligned state of the liquid crystal molecules is keep at the desired state during the non-selecting period, and the desired display color is maintained.

The power supply circuit 59 has an AC adapter and a battery. The power supply circuit 59 converts the commercially available AC voltage, externally supplied, to a DC voltage and supplies it to the internal circuits. When the external power supply is stopped, the power supply circuit 59 provides the internal circuits with the power from the battery.

The operation of the LCD apparatus shown in FIG. 41 will be described below.

Figure 42B:
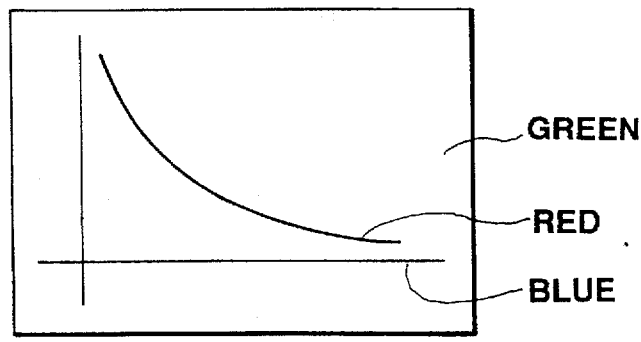
Figure 42C:
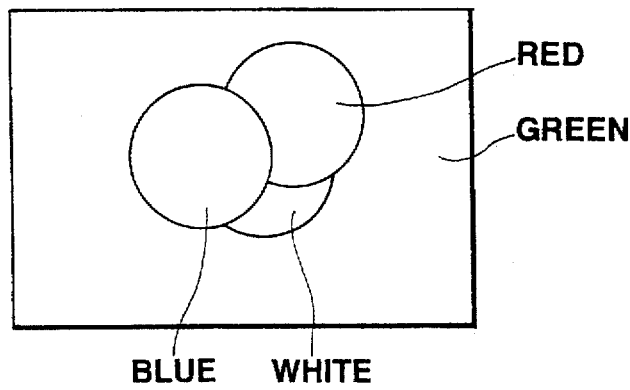

As described earlier, the display images include text data as shown in FIG. 42A, line charts as shown in FIG. 42B and figures as shown in FIG. 42C, and the background portion is displayed in green and the data portion in other colors. Accordingly, the CPU 43 outputs image data of (RGB)= (010) for the pixels of the background portion, and outputs image data corresponding to the display colors for the pixels of the data portion. For example, the CPU 43 outputs image data of (RGB)=(001) for the pixels of the text data or the vertical scale portion and horizontal scale portions of the line chart, and outputs image data of (RGB)=(100) for the curved portion in the line chart.

The image data written in the image memory 22 by the CPU 43 is read pixel by pixel (three bits each) for each scan line by the display controller 53, and is sequentially supplied to the address terminals of the conversion table 55. In accordance with the stored data, the conversion table 55 supplies digital voltage data for displaying the color indicated by the image data to the D/A converter 57.

As shown in FIG. 43, the conversion table 55 outputs digital voltage data "000" when the image data is (010), outputs digital voltage data "010" when the image data is (001), and outputs digital voltage data "011" when the image data is (100).

The D/A converter 57 converts the 3-bit voltage data sequentially supplied from the conversion table 55 to an analog voltage, and outputs it. For example, the D/A converter 57 converts digital voltage data "000" to 0 V, digital voltage data "010" to 1.5 V and digital voltage data "011" to 2.2 V and outputs the resultant analog voltage. Each voltage corresponds to the reference voltage applied to the opposing electrode 51.

The column driver 22 samples one line of video signals, supplied from the D/A converter 57, and outputs the sampled signals to the associated data line 49 in the next horizontal scan period.

The row driver 21 sequentially applies the gate pulse to the gate lines 47 in accordance with the timing signal from the CPU 43 to select (scan) the pixel electrodes 43. Voltages corresponding to the display colors are applied via the data line 49 and the TFTs 45 to the selected pixel electrodes 43, and those voltages are held in the non-selecting period (substantially in one frame period).

The liquid crystal molecules at the individual pixels are aligned in accordance with the applied voltages, and the colors indicated by the image data are displayed by the birefringence effect according to the aligned state.

By repeating the above operation, the color defined by the image data stored in the image memory 22 is displayed on the LCD device 41.

With respect to image data in the background portion in green, which occupies most of the area of the display image, the D/A converter 57 outputs 0 V which is applied to the data line 49. Therefore, the consumed power in the LCD device 41 is small, and the total consumed power of the color LCD apparatus becomes smaller.

In displaying text data such as characters and symbols, a line chart or the like, for example, the background portion occupies most of the display image. According to this embodiment, since the display color of this background portion (first color) matches with the display color at the time no voltage is applied to the color LCD device, it is unnecessary to apply a voltage to the most pixels corresponding to the background portion and voltage corresponding to the display color has only to be applied to the portions equivalent to the text data or the line chart. The color LCD device can therefore be driven with low consumed power, thus reducing the consumed power of the overall color LCD apparatus.

Although 0 V is applied to the individual pixels when displaying the background portion of the display image in green in the above-described embodiment, another voltage may also be applied as long as green can be displayed substantially.

For any LCD device which needs a constant bias voltage to be applied to the liquid crystal to display colors, the lowest voltage, not 0 V, among applied voltages should be applied to display the background portion.

In the above embodiment, the background portion of the display image (the portion with the color occupying the largest display area) is displayed in green and the data portion is displayed in other colors than green. But, the background color can be selected arbitrarily. For example, the background portion may be displayed in red. As the LCD device 41 which displays red when no voltage is applied, the LCD devices of the first to ninth embodiments may be used.

Twelfth Embodiment

In the above embodiment, the color of the background portion of the image defined by the image data is caused to match with the display color at the time no voltage is applied to the color LCD device, thus reducing the consumed power. If the background color defined by the image data differs from the display color at the time the lowest voltage is applied to the color LCD device, the consumed power may be reduced by forcibly converting the color of the background portion to the color that is displayed when the applied voltage is the lowest. A color LCD apparatus with this structure will now be described.

Figure 41:
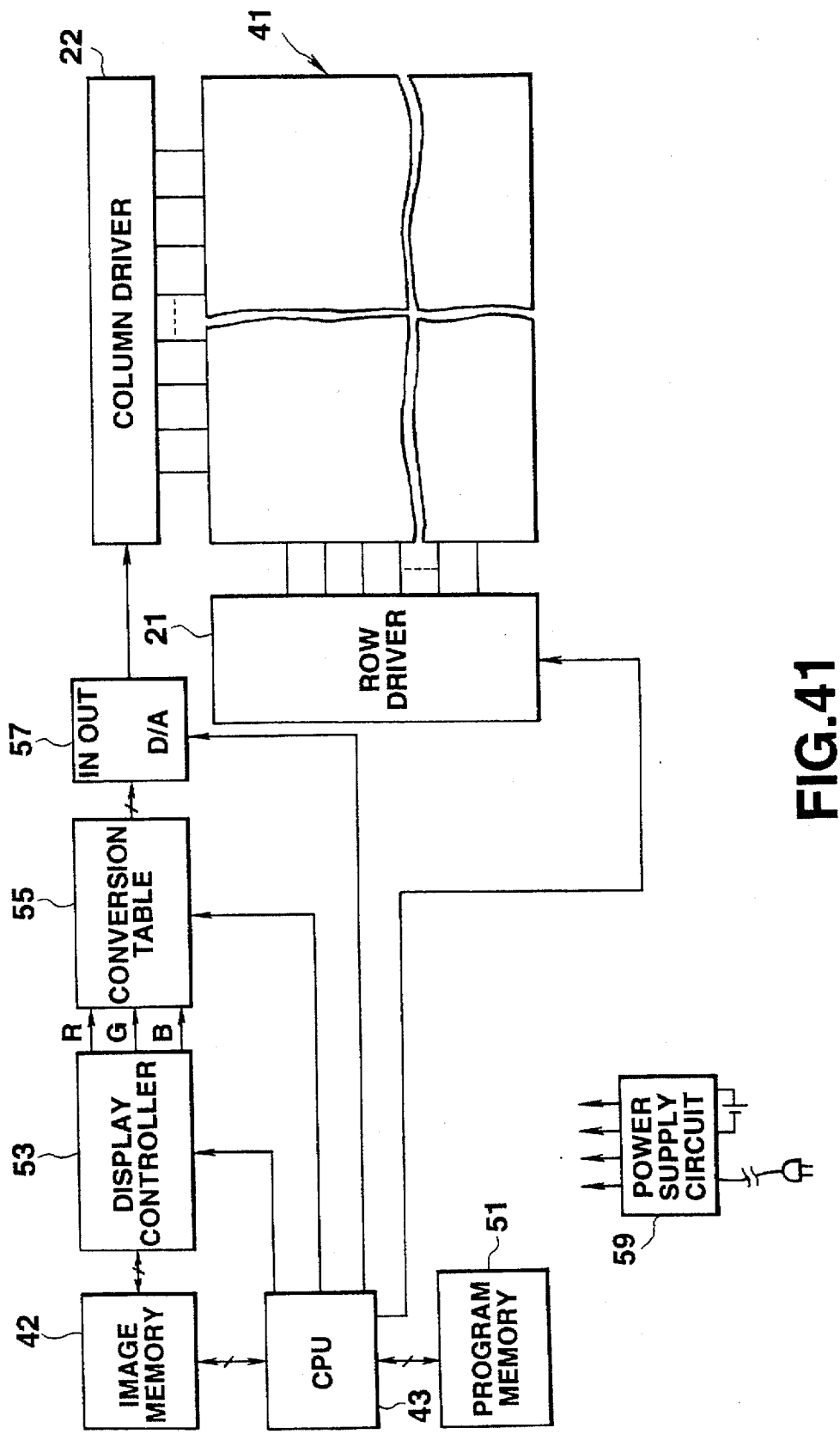
FIG. 41 is a block diagram showing the structure of an LCD apparatus according to a tenth embodiment of this invention.

The structure of the color of this embodiment is substantially the same as the structure shown in FIG. 41.

When power from an external power supply is stopped and the power supply circuit 59 outputs the operational voltage based on the output of the battery, a mode switch signal is sent to the CPU 43. In response to this mode switch signal, the CPU 43 is set to a power save mode. In accordance with this setting, the CPU 43 performs a process, such as reducing the frequency of its own operation clock, and checks image data stored in the image memory 22 to detect the image data which has the highest frequency of occurrence.

For instance, the CPU 43 (1) may check one screen of image data stored in the image memory 22 at that time to detect the image data having the highest frequency of occurrence or the image data corresponding to the color occupying the largest display area in the screen, (2) may check multiple frames of image data sequentially stored in the image memory 22 for any one pixel or a plurality of pixels to detect the image data having the highest frequency of occurrence, or (3) may check multiple screens of image data to detect the image data having the highest frequency of occurrence.

Next, the CPU 43 accesses the conversion table 55 to save the contents of the conversion table 55 at that time, and exchanges the digital voltage data corresponding to the image data which has been determined to have the highest frequency of occurrence with the digital voltage data "000" (digital voltage data corresponding to the lowest applied voltage).

Figure 44:
FIG. 44 is a diagram exemplifying the structure of a conversion table shown in FIG. 41.
Figure 45A:
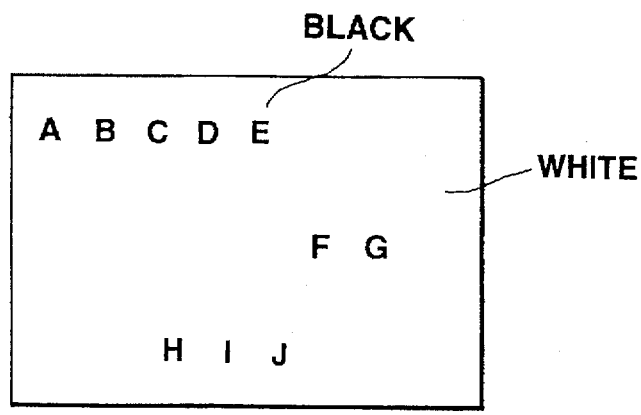
FIGS. 45A through 45C are diagrams exemplifying display images.
Figure 45B:
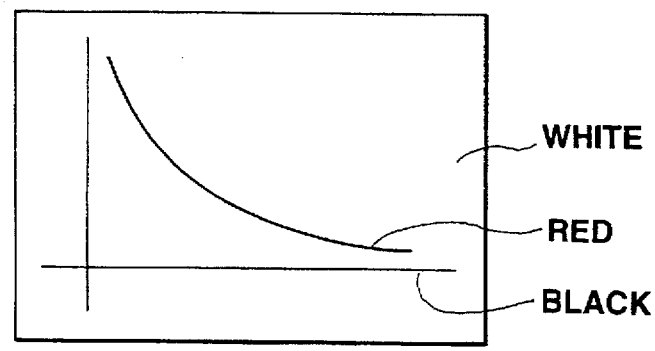
Figure 45C:
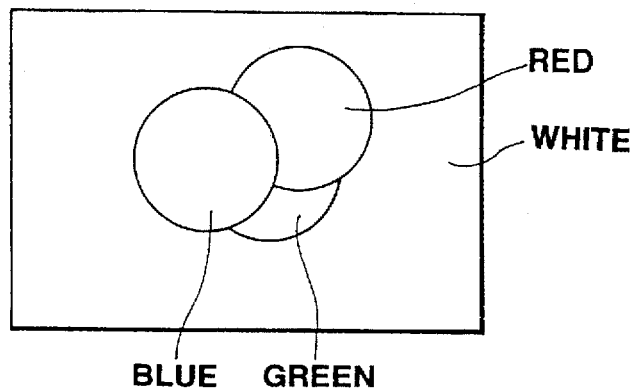

If the current contents of the conversion table 55 are as shown in FIG. 43 and the image data which has been determined to have the highest frequency of occurrence is "100," for example, the CPU 43 rewrites the contents of the conversion table 55 as shown in FIG. 44.

Thereafter, the image preparation and display process will be executed in the same manner as done in the eleventh embodiment.

With this structure, although the color of the image to be actually displayed in power save mode differs from the color originally expected by the program stored in the program memory 51, the consumed power can be reduced.

When power supply from the external power supply starts again, the power supply circuit 59 sends the mode switch signal to the CPU 43. In response to this mode switch signal, the CPU 43 enters the normal mode and restores the contents of the conversion table 55 to the original data.

In power save mode, whether or not to change the display color (whether or not to reduce the consumed power) may be selected by the operation of a user.

In the twelfth embodiment too, the voltage corresponding to the image data with the highest frequency of occurrence is not limited to 0 V, but another voltage which provides the same color as in the case where 0 V is applied. When the bias voltage is needed or the like, the lowest voltage among the available applied voltages should be applied.

According to the eleventh and twelfth embodiments of this invention, as described above, a low voltage is applied to the individual pixels of the LCD device in association with the image data having the highest frequency of occurrence, so that the power for displaying the color of the highest frequency of occurrence, thus reducing the consumed power of the overall color LCD apparatus.

Thirteenth Embodiment

While the eleventh and twelfth embodiments can suppress the consumed power, they present prominent irregular display. The thirteenth embodiment provides an LCD apparatus which presents less irregular display.

The basic structure of the LCD apparatus of this embodiment is the same as the LCD apparatus shown in FIG. 41, and the LCD device may take the structures of the first to ninth embodiments, which displays "white" with a high applied voltage.

The display image specified by the image data stored in an image memory 42 is displayed in such a way that the background portion of each displayed image (the portion with the color having the widest display area) is in white, and the text (characters and symbols) portion, the line chart portion and the figure portion are in other colors, as shown in FIGS. 46A to 46C.

Accordingly, the CPU 43 outputs image data of (RGB)= (111) for the pixels of the background portion, and outputs image data corresponding to the display colors for the pixels of the data portion. For example, the CPU 43 outputs image data of (RGB)=(000) for the pixels of the text data or the vertical scale portion and horizontal scale portions of the line chart, and outputs image data of (RGB)=(100) for the curved portion in the line chart.

Figure 47:
FIG. 47 is a diagram exemplifying the structure of a conversion table shown in FIG. 41.

As shown in FIG. 47, the conversion table 55 converts image data (111) to digital voltage data "111," image data (000) to digital voltage data "101" and converts image data (100) to digital voltage data "000."

The D/A converter 57 converts the 3-bit voltage data sequentially supplied from the conversion table 55 to an analog voltage, and outputs it. For example, the D/A converter 57 converts digital voltage data "111" to 5 V, digital voltage data "101" to 2.6 V and digital voltage data "000" to 0 V and outputs the resultant analog voltage. Each voltage is obtained with voltage applied to the opposing electrode 51 as a reference.

With regard to image data in white in the background portion that occupies the most of the area of the display image, the D/A converter 57 outputs 5 V which in turn is applied to the data line 49. Therefore, 5 V is applied to a liquid crystal 59 at each pixel and the molecules of the liquid crystal are aligned nearly perpendicularly to the major surfaces of substrates 41 and 42. In this state, the refractive anisotropy $\Delta n$ of the liquid crystal 59 is the smallest, and the product of the refractive anisotropy $\Delta n$ of the liquid crystal 59 and the liquid crystal layer thickness d, $\Delta n.d$, is small accordingly. Even if the thickness d changes slightly, $\Delta n.d$ does not change much. As a result, color irregularity originating from a change in the thickness d does not occur in the portion with the white display color or the background portion (the portion of the color occupying the largest display area), so that a beautiful image can be displayed.

Although the background portion (the portion of the color occupying the largest display area) is displayed in white in the above embodiment, the background portion may be displayed in another color, e.g., black. As the LCD device 41 which displays black when the liquid crystal molecules are aligned nearly perpendicular to the major surfaces of the substrates, the LCD device of the tenth embodiment may be used.

Fourteenth Embodiment

In the above embodiment, the color of the background portion of the image defined by the image data is caused to match with the display color at the time the highest voltage is applied to the color LCD device, thus reducing the irregular display. If the background color defined by the image data differs from the display color at the time the highest voltage is applied to the color LCD device, the consumed power may be reduced by forcibly converting the color of the background portion to the color that is displayed when the applied voltage is the highest.

In this case, the color irregularity may be reduced by displaying the image data having the highest frequency of occurrence (generally, the image data in the background portion) in the color which is displayed when the liquid crystal molecules are aligned nearly perpendicular to the major surfaces of the substrates. As a method of detecting the image data having the highest frequency of occurrence, the one explained in the section of the twelfth embodiment may be used.

If the current contents of the conversion table 55 are as shown in FIG. 46 and the image data which has been determined to have the highest frequency of occurrence is "100," for example, the CPU 43 rewrites the contents of the conversion table 55 as shown in FIG. 47.

Thereafter, the image preparation and display process will be executed in the same manner as done in the first embodiment.

With this structure, although the color of the image to be actually displayed in power save mode differs from the color originally expected by the program stored in the program memory 51, a broad portion like the background portion can be displayed without color irregularity.

In the fourteenth embodiment too, the voltage corresponding to the image data with the highest frequency of occurrence is not limited to 5 V, but any voltage high enough to align the liquid crystal molecules nearly perpendicular to the major surfaces of the substrates can be used.

Fifteenth Embodiment

Figure 48:
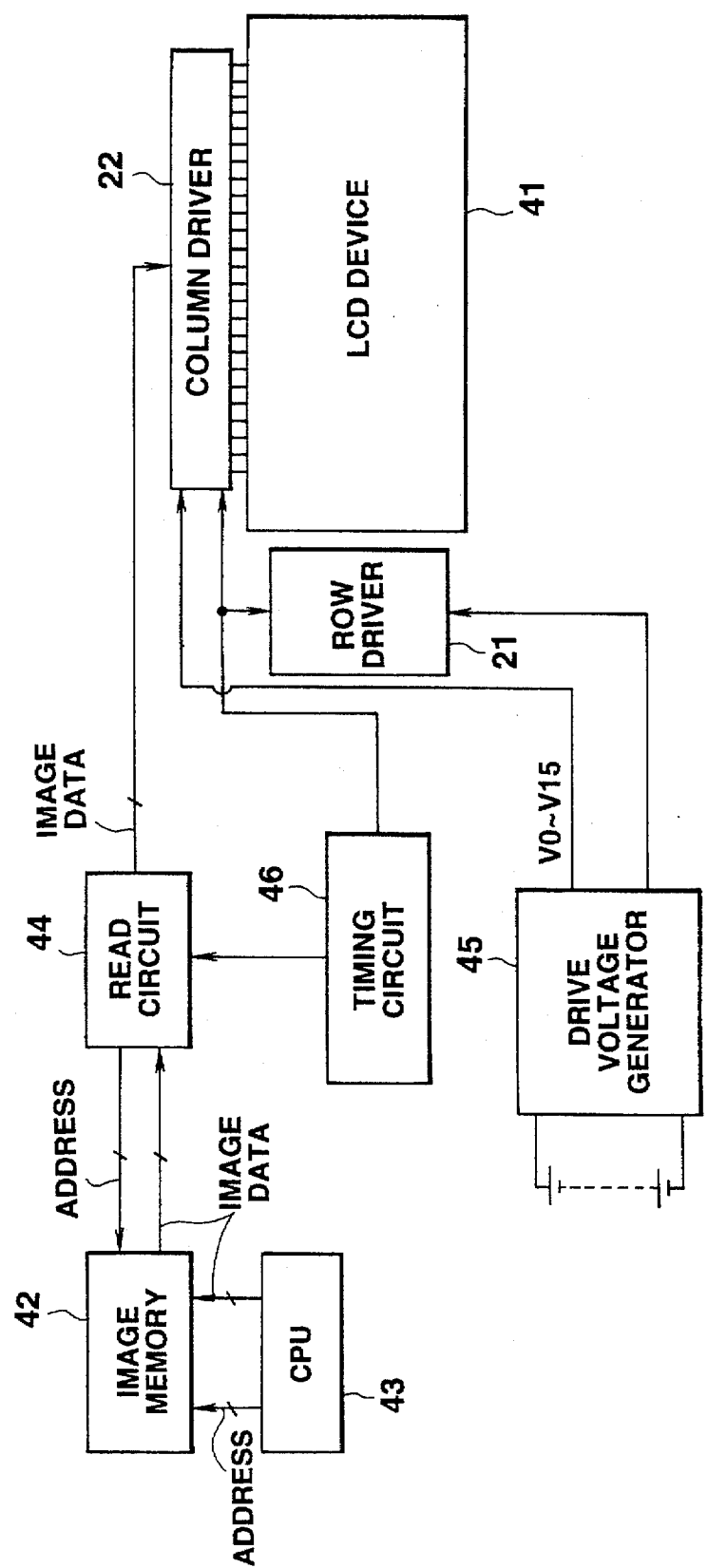
FIG. 48 is a circuit diagram showing an LCD apparatus according to another embodiment of this invention.

The structure of the LCD apparatus embodying this invention is not limited to the one shown in FIG. 41. For example, the structure shown in FIG. 48 may be used. In FIG. 48 like or same reference numerals as used in FIG. 41 are also used for corresponding or identical parts.

In FIG. 48, the column driver 22 is supplied with 16 levels of voltages V0 to V15 produced by a drive voltage generator 45.

A read circuit 44 sequentially reads image data from an image memory 42 line by line in accordance with the timing signal from a timing circuit 46, and supplies the image data to the column driver 22. The column driver 22 sequentially latches one line of image data in response to the timing signal from the timing circuit 46.

The column driver 22 selects the voltage corresponding to the image data latched in the previous horizontal scan period from among the voltages V0 to V15, and applies the voltage to the associated data line (indicated by numeral "6" in FIG. 2) of the LCD device 41.

The row driver 21 sequentially applies the gate pulse to the gate line (indicated by numeral "5" in FIG. 2) of the LCD device 41 in response to the timing signal from the timing circuit 46.

This structure can also display an image with less irregularity with less consumed power as per the eleventh to fourteenth embodiments.

The present invention is not limited to the LCD devices of the first to tenth embodiments and the LCD apparatuses of the eleventh to fifteenth embodiments, but may be embodied and adapted in various other forms.

For example, the angles discussed in the sections of the first to tenth embodiments need not take the illustrated values accurately, but have only to be substantially equal to those values; they may vary within the range of ±6 degrees. It is however desirable that the variation be suppressed to ±3 degrees.

Although an active matrix type of LCD device using TFTs (Thin Film Transistors) as active devices has been described in the foregoing descriptions of the embodiments, the present invention may be applied to an active matrix type of LCD device which uses MIMs (Metal Insulator Metals) or the like as active devices, and a direct matrix type of LCD device as well.

Although the foregoing descriptions of the embodiments illustrate a reflection type LCD device equipped with the reflector 15, the present invention may be applied to a transparent type LCD device as well.

The LCD device 41 in the eleventh to fifteenth embodiments need not be constituted of the LCD devices of the first to tenth embodiments, but may take an arbitrary structure.

What is claimed is:

1. A color liquid crystal display device comprising:

a pair of substrates arranged to face each other, at least one electrode being formed on an inner surface of each substrate such that said electrodes on said substrates oppose each other;

aligning films formed on surfaces of said pair of substrates on which said electrodes are formed;

a liquid crystal sealed between said aligning films so as to form a liquid crystal layer; and at least one polarization plate arranged outside of at least one of said substrates, said liquid crystal layer having a variable birefringence which varies in accordance with a voltage applied between said opposing electrodes, and an optical axis of said polarization plate being set to a predetermined direction so that said color liquid crystal display device operates in a first mode in which a hue of a display color changes in accordance with a change in said voltage applied between said opposing electrodes when said voltage is within a first voltage range, and so that said color liquid crystal device operates in a second mode in which a brightness of a display changes in a substantially colorless manner in accordance with a change in said voltage applied between said opposing electrodes when said voltage is within a second voltage range.

2. The liquid crystal display device according to claim 1, wherein said birefringence of said liquid crystal layer is such that a polarization state of light passing and leaving said polarization plate in said first mode changes as said birefringence changes in accordance with applied voltages within said first voltage range in such a way as to change a wavelength distribution of light passing and leaving said polarization plate to thereby change the display color to a plurality of colors including primary colors, and such that the polarization state of light passing said liquid crystal cell in said second mode changes as said birefringence of said liquid crystal changes in accordance with applied voltages within said second voltage range in such a way as to change an intensity of light passing and leaving said polarization plate with a nearly constant wavelength distribution.

3. The liquid crystal display device according to claim 1, wherein said liquid crystal display device has an operation characteristic for changing the hue in an order of red, green and blue or green, blue and red in accordance with a rise in applied voltages within said first voltage range in said first mode.

4. The liquid crystal display device according to claim 1, wherein said second voltage range is higher than said first voltage range.

5. The liquid crystal display device according to claim 1, further comprising drive means, connected to said electrodes, for controlling said applied voltage in said first voltage range to control said birefringence of said liquid crystal to thereby change the hue of the display color, and for controlling said applied voltage in said second voltage range to control said birefringence of said liquid crystal to thereby change the brightness without changing the hue.

6. The liquid crystal display device according to claim 1, wherein said liquid crystal is twisted by a predetermined angle in accordance with an aligning treatment performed on opposing surfaces of said aligning films.

7. The liquid crystal display device according to claim 1, wherein a product of a refractive anisotropy and thickness of said liquid crystal layer is set equal to or greater than 0.7 μm and less than 1.1 μm, and said liquid crystal layer is formed of a liquid crystal twisted by substantially 90 degrees.

8. The liquid crystal display device according to claim 1, wherein a product of a refractive anisotropy and thickness of said liquid crystal layer is set equal to or greater than 0.7 μm and less than 1.1 μm; and wherein said display device further comprises a retardation plate arranged outside of said pair of substrates.

9. The color liquid crystal display device according to claim 8, wherein said aligning films include a first aligning film formed on an inner surface of one of said pair of substrates and subjected to an aligning treatment in a first direction, and a second aligning film formed on an inner surface of the other one of said pair of substrates and subjected to an aligning treatment in a second direction intersecting said first direction at substantially 90 degrees;

said liquid crystal is sealed between said first and second aligning films and twisted by substantially 90 degrees; and said at least one polarization plate comprises a first polarization plate arranged outside of said first substrate and having a transmission axis intersecting said first direction at substantially 140 to 160 degrees, and a second polarization plate arranged outside of said second substrate and having a transmission axis intersecting said transmission axis of said first polarization plate at substantially 10 to 40 degrees or 110 to 130 degrees.

10. The color liquid crystal display device according to claim 1, wherein said aligning films include a first aligning film formed on an inner surface of one of said pair of substrates and subjected to an aligning treatment in a first direction, and a second aligning film formed on an inner surface of the other one of said pair of substrates and subjected to an aligning treatment in a second direction intersecting said first direction at substantially 90 degrees; and wherein said display device further comprises first and second retardation plates respectively arranged outside of said pair of substrates, said first retardation plate being arranged with a direction of a maximum refraction index intersecting said first direction at substantially 40 to 80 degrees, and said second retardation plate being arranged with a direction of a maximum refraction index intersecting said first direction at substantially 130 to 160.

11. The color liquid crystal display device according to claim 1, wherein said aligning films include a first aligning film formed on an inner surface of one of said pair of substrates and subjected to an aligning treatment in a first direction, and a second aligning film formed on an inner surface of the other one of said pair of substrates and subjected to an aligning treatment in a second direction intersecting said first direction at substantially 90 degrees; and wherein said display device further comprises a retardation plate arranged outside of said pair of substrates and having a direction of a maximum refraction index intersecting said first direction at substantially 130 to 160 degrees or 60 to 80 degrees.

12. The color liquid crystal display device according to claim 1, wherein said polarization plate has a reflector.

13. The color liquid crystal display device according to claim 1, wherein said aligning films include a first aligning film formed on an inner surface of one of said pair of substrates and subjected to an aligning treatment in a first direction, and a second aligning film formed on an inner surface of the other one of said pair of substrates and subjected to an aligning treatment in a second direction intersecting said first direction at substantially 90 degrees; and wherein said at least one polarization plate comprises a first polarization plate arranged outside of said one of said pair of substrates and having a transmission axis intersecting said first direction at substantially 140 to 160 degrees, and a second polarization plate arranged outside of the other one of said pair of substrates and having a transmission axis intersecting said transmission axis of said first polarization plate at substantially 10 to 40 degrees or 110 to 130 degrees.

14. The color liquid crystal display device according to claim 1, wherein said color liquid crystal display device operates in said first mode to display a first color in accordance with a first voltage within said first voltage range applied to said liquid crystal, and to display a second color different from said first color in accordance with a second voltage within said first voltage range higher than said first voltage; and wherein said color liquid crystal display device further comprises:

image data output means for outputting image data for specifying colors of individual pixels of said liquid crystal display device; and drive means for applying said first voltage to said liquid crystal via said electrodes in association with image data with a highest frequency of occurrence from among image data output from said image data output means, and for applying said second voltage to said liquid crystal via said electrodes in association with image data with a low frequency of occurrence.

15. A color liquid crystal display device comprising:

first and second substrates arranged to face each other;

first and second electrodes formed on opposing surfaces of said first and second substrates;

a first aligning film formed on said first electrode and said first substrate and subjected to an aligning treatment in a first direction;

a second aligning film formed on said second electrode and said second substrate and subjected to an aligning treatment in a second direction intersecting said first direction at substantially 90 degrees;

a liquid crystal sealed between said first and second aligning films so as to form a liquid crystal layer and twisted at substantially 90 degrees, a product of a refractive anisotropy Δn and a thickness of said liquid crystal layer being equal to or greater than 0.7 μm and less than 1.1 μm;

a first polarization plate arranged outside of said first substrate and having a transmission axis intersecting said first direction at substantially 140 to 160 degrees;

a second polarization plate arranged outside of said second substrate and having a transmission axis intersecting said transmission axis of said first polarization plate at substantially 10 to 40 degrees or 110 to 130 degrees; and at least one retardation plate arranged between said first and second polarization plates.

16. The color liquid crystal display device according to claim 15, wherein said at least one retardation plate comprises:

a first retardation plate arranged between said second substrate and said second polarization plate, with a direction of a maximum refraction index intersecting said first direction at substantially 40 to 80 degrees; and a second retardation plate arranged between said second substrate and said second polarization plate, with a direction of a maximum refraction index intersecting said first direction at substantially 130 to 160.

17. A color liquid crystal display device comprising:

a pair of substrates arranged to face each other, at least one electrode being formed on an inner surface of each substrate such that said electrodes on said substrates face each other;

aligning films formed on surfaces of said pair of substrates on which said electrodes are formed;

a liquid crystal sealed between said aligning films so as to form a liquid crystal layer, a birefringence of said liquid crystal layer being variable in accordance with a voltage applied between said facing electrodes; and at least one polarization plate arranged outside of at least one of said substrates, said birefringence of said liquid crystal layer being such that, and a direction of an optical axis of said polarization plate being set to a predetermined direction such that, a wavelength-dependency of intensity of transmission light through said color liquid crystal device, with said birefringence defined by an aligned state of liquid crystal molecules according to a highest one of voltages applied between said facing electrodes, is compensated, for displaying substantial white with colorless and high brightness in accordance with said highest applied voltage, and colors in accordance with applied voltages other than said highest applied voltage.

18. The color liquid crystal display device according to claim 17, wherein:

said display device has a first operation range in which said color liquid crystal display device operates in a first voltage range including said highest voltage, such that an intensity of light leaving said polarization plate changes with a nearly constant wavelength distribution in accordance with applied voltages within said first voltage range; and said display device has a second operation range in which said color liquid crystal display device operates in a second voltage range lower than said first voltage range such that a wavelength distribution of light leaving said polarization plate changes in accordance with applied voltages within said second voltage range.

19. The color liquid crystal display device according to claim 17, wherein a reflector is provided on an outer surface of said polarization plate.

20. The color liquid crystal display device according to claim 17, wherein said aligning films include a first aligning film formed on said first electrode and said first substrate and subjected to an aligning treatment in a first direction, and a second aligning film formed on said second electrode and said second substrate and subjected to an aligning treatment in a second direction intersecting said first direction at a predetermined angle; and said at least one polarization plate comprises a first polarization plate arranged outside of said first substrate and having a transmission axis intersecting said first direction at substantially 140 to 160 degrees, and a second polarization plate arranged outside of said second substrate and having a transmission axis intersecting said transmission axis of said first polarization plate at substantially 10 to 40 degrees or 110 to 130 degrees.

21. The color liquid crystal display device according to claim 17, wherein said at least one polarization plate has a reflector.

22. A color liquid crystal display device comprising:

a pair of substrates arranged to face each other, at least one electrode being formed on an inner surface of each substrate such that said electrodes on said substrates face each other;

aligning films formed on surfaces of said pair of substrates on which said electrodes are formed;

a liquid crystal sealed between said aligning films so as to form a liquid crystal layer, a birefringence of said liquid crystal layer being variable in accordance with a voltage applied between said facing electrodes; and at least one polarization plate arranged outside of at least one of said substrates, said birefringence of said liquid crystal layer being such that, and a direction of an optical axis of said polarization plate being set such that, white is substantially displayed with liquid crystal molecules aligned substantially perpendicular to one of said substrate surfaces in accordance with said voltage applied between said electrodes, and colors are displayed in other aligned states.

23. The color liquid crystal display device according to claim 22, wherein said display device has a first operation range in which said display device operates in a first voltage range wherein said liquid crystal molecules are aligned substantially perpendicular to said one of said substrate surfaces when said applied voltage is within said first voltage range, and a second operation range in which said display device operates in a second voltage range lower than said first voltage range wherein a hue of light leaving said polarization plate changes in accordance with applied voltages within the second voltage range.

24. The color liquid crystal display device according to claim 22, further comprising at least one retardation plate arranged outside of said pair of substrates.

25. The color liquid crystal display device according to claim 24, wherein said at least one retardation plate comprises first and second retardation plates respectively arranged outside of said pair of substrates.

26. The color liquid crystal display device according to claim 25, wherein said aligning films include a first aligning film formed on said first electrode and said first substrate and subjected to an aligning treatment in a first direction, and a second aligning film formed on said second electrode and said second substrate and subjected to an aligning treatment in a second direction intersecting said first direction at substantially 90 degrees; and wherein said first retardation plate is arranged with a direction of a maximum refraction index intersecting said first direction at substantially 40 to 80 degrees, and said second retardation plate is arranged with a direction of a maximum refraction index intersecting said first direction at substantially 130 to 160 degree.

27. The color liquid crystal display device according to claim 24, wherein said at least one retardation plate consists of a single retardation plate.

28. The color liquid crystal display device according to claim 27, wherein said aligning films include a first aligning film formed on said first electrode and said first substrate and subjected to an aligning treatment in a first direction, and a second aligning film formed on said second electrode and said second substrate and subjected to an aligning treatment in a second direction intersecting said first direction at substantially 90 degrees; and wherein said retardation plate is arranged outside of said second substrate with a direction of a maximum refraction index intersecting said first direction at substantially 130 to 160 degrees or 60 to 80 degrees.

29. A liquid crystal display device comprising:

first and second substrates arranged to face each other;

first and second electrodes formed on opposing surfaces of said first and second substrates;

a first aligning film formed on said first electrode and said first substrate and subjected to an aligning treatment in a first direction;

a second aligning film formed on said second electrode and said second substrate and subjected to an aligning treatment in a second direction intersecting said first direction at substantially 90 degrees;

a liquid crystal located between said first and second aligning films so as to form a liquid crystal layer, a product of a refractive anisotropy $\Delta n$ and a thickness of said liquid crystal layer being equal to or greater than 0.7 μm and less than 1.1 μm;

a first polarization plate arranged outside of said first substrate and having an optical axis intersecting said first direction at substantially 145 to 160 degrees; and a second polarization plate arranged outside of said second substrate and having an optical axis intersecting said first direction at substantially 130 degrees or 40 degrees.

* * * * *